United States Patent
Karakkad Kesavan Namboodiri et al.

(10) Patent No.: US 10,681,583 B2
(45) Date of Patent: Jun. 9, 2020

(54) CELL QUALITY MEASUREMENT REPORTING FOR CELLS WITH MISMATCHED BEAM NUMBERS

(71) Applicant: QUALCOMM Incorporated, San Diego, CA (US)

(72) Inventors: Vishnu Namboodiri Karakkad Kesavan Namboodiri, Hyderabad (IN); Sahas Sathyanarayana, Hyderabad (IN); Ansah Ahmed Sheik, Hyderabad (IN); Rajesh Gopala Krishnan, Hyderabad (IN); Theeksha Athoor Perumal, Hyderabad (IN); Chinmaya Padhy, Koraput (IN); Suresh Sanka, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/214,662

(22) Filed: Dec. 10, 2018

(65) Prior Publication Data

US 2019/0191327 A1 Jun. 20, 2019

(30) Foreign Application Priority Data

Dec. 14, 2017 (IN) .............................. 201741044996

(51) Int. Cl.
*H04W 24/10* (2009.01)
*H04W 36/00* (2009.01)
(Continued)

(52) U.S. Cl.
CPC .......... *H04W 24/10* (2013.01); *H04B 7/0617* (2013.01); *H04W 36/0069* (2018.08);
(Continued)

(58) Field of Classification Search
CPC ............. H04W 24/10; H04W 36/0069; H04W 36/0085; H04W 36/30; H04W 36/32; H04W 48/20
(Continued)

(56) References Cited

U.S. PATENT DOCUMENTS

2017/0214444 A1* 7/2017 Nigam .................. H04B 7/0634
2018/0324687 A1* 11/2018 Chen .................. H04W 36/0083

FOREIGN PATENT DOCUMENTS

WO WO-2017195494 A1 11/2017

OTHER PUBLICATIONS

International Search Report and Written Opinion—PCT/US2018/064980—ISA/EPO—dated May 16, 2019.
(Continued)

*Primary Examiner* — Anthony S Addy
*Assistant Examiner* — Farid Seyedvosoghi
(74) *Attorney, Agent, or Firm* — Holland & Hart LLP

(57) ABSTRACT

Methods, systems, and devices for wireless communications are described. A user equipment (UE) may measure a power value for each beam from one or more cells and calculate an average beam power for each cell. The UE may transmit these calculated averages to a base station in a report, and the base station may select a cell for communications based on the measurement report. The UE may also include a number indicating how many beams are used when calculating an average beam power, a ratio between a maximum and minimum beam power for each cell, two average beam powers based on two defined thresholds, or a combination of these measurements, in the transmitted report. The UE may add a bias to the average beam power for a particular cell to indicate a preference for that cell over the other candidate cells.

15 Claims, 21 Drawing Sheets

(51) Int. Cl.
  *H04B 7/06* (2006.01)
  *H04W 36/30* (2009.01)
  *H04W 36/32* (2009.01)
  *H04W 48/20* (2009.01)

(52) U.S. Cl.
  CPC ....... *H04B 7/0632* (2013.01); *H04W 36/0085* (2018.08); *H04W 36/30* (2013.01); *H04W 36/32* (2013.01); *H04W 48/20* (2013.01)

(58) Field of Classification Search
  USPC ...................................................... 455/434
  See application file for complete search history.

(56) References Cited

OTHER PUBLICATIONS

HTC: "Discussion on Cell (Re)Selection While the Beam Number is Less than N", 3GPP Draft; R2-1707447 Discussion on Cell (Re)Selection While the Beam Number is Less than N, 3rd Generation Partnership Project (3GPP), Mobile Competence Centre, 650, Route Des Lucioles ; F-06921 Sophia-Antipolis Cedex, France, vol. RAN WG2, No. Qingdao, China; Jun. 27, 2017-Jun. 29, 2017, Jun. 26, 2017 (Jun. 26, 2017), XP051301936, pp. 1-2, Retrieved from the Internet: URL: http://www.3gpp.org/ftp/Meetings_3GPP_SYNC/RAN2/Docs/ [retrieved on Jun. 26, 2017], Paragraphs 1 and 2.

Huawei., et al., "Remaining Issues on Cell Quality Derivation", 3GPP Draft; R2-1708702 Remaining Issues on Cell Quality Derivation, 3rd Generation Partnership Project (3GPP), Mobile Competence Centre, 650, Route Des Lucioles, F-06921 Sophia-Antipolis Cedex, France, vol. RAN WG2. No. Berlin, Germany; Aug. 21, 2017-Aug. 25, 2017, Aug. 20, 2017 (Aug. 20, 2017), XP051318507, 3 Pages, Retrieved from the Internet: URL: http://www.3gpp.org/ftp/Meetings_3GPP_SYNC/RAN2/Docs/ [retrieved on Aug. 20, 2017], Paragraphs 1 to 3.

Intel Corporation: "Filter, Serving Cell Quality and Remaining Issues in RRM", 3GPP Draft; R2-1703417, 3rd Generation Partnership Project (3GPP), Mobile Competence Centre, 650, Route Des Lucioles ; F-06921 Sophia-Antipolis Cedex, France, vol. RAN WG2, No. Spokane, USA; Apr. 3, 2017-Apr. 7, 2017, Apr. 3, 2017 (Apr. 3, 2017), XP051245273, pp. 1-4, Retrieved from the Internet: URL: http://www.3gpp.orgjftp/Meetings_3GPP_SYNC/RAN2/Docs/ [retrieved on Apr. 3, 2017], Paragraphs 1 to 2.2.

Partial International Search Report—PCT/US2018/064980—ISA/EPO—dated Mar. 21, 2019.

SONY: "Cell Quality Evaluation", 3GPP Draft; R2-1703283 NR Cell Quality Beams, 3rd Generation Partnership Project (3GPP), Mobile Competence Centre, 650, Route Des Lucioles ; F-06921 Sophia-Antipolis Cedex, France, vol. RAN WG2, No. Spokane, USA; Apr. 3, 2017-Apr. 7, 2017, Apr. 3, 2017 (Apr. 3, 2017), XP051245169, 5 Pages, Retrieved from the Internet: URL: http://www.3gpp.org/ftp/Meetings_3GPP_SYNC/RAN2/Docs/ [retrieved on Apr. 3, 2017], Paragraph 2.

ZTE Corporation ., et al., "Discussion on Requirement of Measurement in E-UTRAN", 3GPP Draft; R2-1710436 Discussion on Requirement of Measurement in E-UTRAN, 3rd Generation Partnership Project (3GPP), Mobile Competence Centre, 650, Route Des Lucioles, F-06921 Sophia-Antipolis Cedex, France, vol. RAN WG2. No. Prague, Czech Republic; Oct. 9, 2017-Oct. 13, 2017, Oct. 8, 2017 (Oct. 8, 2017), XP051342481, pp. 1-4, Retrieved from the Internet: URL: http://www.3gpp.org/ftp/Meetings_3GPP_SYNC/RAN2/Docs/ [retrieved on Oct. 8, 2017], Paragraphs 2, 4 and 5.

* cited by examiner

US 10,681,583 B2

CELL QUALITY MEASUREMENT REPORTING FOR CELLS WITH MISMATCHED BEAM NUMBERS

CROSS REFERENCES

The present Application for Patent claims the benefit of India Provisional Patent Application No. 201741044996 by KARAKKAD KESAVAN NAMBOODIRI et al., entitled "CELL QUALITY MEASUREMENT REPORTING FOR CELLS WITH MISMATCHED BEAM NUMBERS," filed Dec. 14, 2017, assigned to the assignee hereof, and expressly incorporated herein.

BACKGROUND

The following relates generally to wireless communication, and more specifically to cell quality measurement reporting for cells with mismatched beam numbers.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems (e.g., NR), a base station may attempt to communicate with a UE through one or more beamformed transmissions. In some cases, the UE may receive beams from multiple cells. For example, the UE may be located in a coverage area for multiple base stations or may move into a coverage area of an additional base station. As such, the UE may measure a quality associated with the beams for each cell and may transmit a report to one or more base stations indicating the measured quality. A base station may select a cell for communications with the UE based on the quality measurements indicated in the report. However, the quality measurements provided in the report may be insufficient to make efficient scheduling decisions in certain cases (e.g., in the case of UE mobility).

SUMMARY

The described techniques relate to improved methods, systems, devices, or apparatuses that support cell quality measurement reporting for cells with mismatched beam numbers. Generally, the described techniques provide for receiving a measurement report from a user equipment (UE) including information for each of a plurality of cells and selecting a cell of the plurality of cells based on the information in the measurement report for communications with the UE. In some cases, the information for each of the plurality of cells may include an average cell quality for each cell, a number of beams associated with each average cell quality, a beam ratio of a maximum beam power and a minimum beam power from the number of beams, a first plurality of average cell quality values and a second plurality of average cell quality values for each cell, a combination of the average cell quality and a cell quality offset value, or a combination thereof. Additionally, an indication of a mobility condition of the UE may be transmitted. A cell may be selected based on the mobility condition in addition to the information included in the measurement report.

A method of wireless communication is described. The method may include receiving a measurement report from a UE indicating an average cell quality for each of a plurality of cells and a number of beams associated with each average cell quality, determining whether the number of beams associated with each average cell quality is the same, and selecting a cell of the plurality of cells for communication based on the determining whether the number of beams associated with each average cell quality is the same.

An apparatus for wireless communication is described. The apparatus may include means for receiving a measurement report from a UE indicating an average cell quality for each of a plurality of cells and a number of beams associated with each average cell quality, means for determining whether the number of beams associated with each average cell quality is the same, and means for selecting a cell of the plurality of cells for communication based on the determining whether the number of beams associated with each average cell quality is the same.

Another apparatus for wireless communication is described. The apparatus may include a processor, memory in electronic communication with the processor, and instructions stored in the memory. The instructions may be operable to cause the processor to receive a measurement report from a UE indicating an average cell quality for each of a plurality of cells and a number of beams associated with each average cell quality, determine whether the number of beams associated with each average cell quality is the same, and select a cell of the plurality of cells for communication based on the determining whether the number of beams associated with each average cell quality is the same.

A non-transitory computer-readable medium for wireless communication is described. The non-transitory computer-readable medium may include instructions operable to cause a processor to receive a measurement report from a UE indicating an average cell quality for each of a plurality of cells and a number of beams associated with each average cell quality, determine whether the number of beams associated with each average cell quality is the same, and select a cell of the plurality of cells for communication based on the determining whether the number of beams associated with each average cell quality is the same.

Some examples of the method, apparatus, and non-transitory computer-readable medium described herein may further include processes, features, means, or instructions for selecting the cell of the plurality of cells based on a default cell selection configuration if the number of beams associated with each average cell quality may be the same.

Some examples of the method, apparatus, and non-transitory computer-readable medium described herein may further include processes, features, means, or instructions for calculating a difference between each average cell quality and a highest average cell quality from among the average cell qualities if the number of beams associated with each average cell quality may be not the same.

Some examples of the method, apparatus, and non-transitory computer-readable medium described herein may further include processes, features, means, or instructions for determining whether a difference between the highest average cell quality and a cell quality for a candidate cell of the plurality of cells may be less than a threshold.

Some examples of the method, apparatus, and non-transitory computer-readable medium described herein may further include processes, features, means, or instructions for selecting the cell of the plurality of cells based on a default cell selection configuration if the difference between the highest average cell quality and the average cell quality for the candidate cell may be greater than the threshold.

Some examples of the method, apparatus, and non-transitory computer-readable medium described herein may further include processes, features, means, or instructions for determining whether the number of beams associated with the highest average cell quality may be less than the number of beams associated with the average cell quality for the candidate cell if the difference between the highest average cell quality and the average cell quality for the candidate cell may be less than the threshold.

Some examples of the method, apparatus, and non-transitory computer-readable medium described herein may further include processes, features, means, or instructions for selecting the cell of the plurality of cells based on a default cell selection configuration if the number of beams associated with the highest average cell quality may be greater than the number of beams associated with the average cell quality for the candidate cell.

Some examples of the method, apparatus, and non-transitory computer-readable medium described herein may further include processes, features, means, or instructions for selecting the candidate cell as the cell of the plurality of cells if the number of beams associated with the highest average cell quality may be less than the number of beams associated with the average cell quality for the candidate cell.

Some examples of the method, apparatus, and non-transitory computer-readable medium described herein may further include processes, features, means, or instructions for selecting the cell of the plurality of cells for communication based on a mobility condition of the UE.

A method of wireless communication at a UE is described. The method may include measuring a quality of a number of beams for each of a plurality of cells, determining an average cell quality for each of the plurality of cells based on the measurement of the number of beams for each of the plurality of cells, and transmitting a measurement report indicating the average cell quality for each of the plurality of cells and the number of beams associated with each average cell quality.

An apparatus for wireless communication is described. The apparatus may include means for measuring a quality of a number of beams for each of a plurality of cells, means for determining an average cell quality for each of the plurality of cells based on the measurement of the number of beams for each of the plurality of cells, and means for transmitting a measurement report indicating the average cell quality for each of the plurality of cells and the number of beams associated with each average cell quality.

Another apparatus for wireless communication is described. The apparatus may include a processor, memory in electronic communication with the processor, and instructions stored in the memory. The instructions may be operable to cause the processor to measure a quality of a number of beams for each of a plurality of cells, determine an average cell quality for each of the plurality of cells based on the measurement of the number of beams for each of the plurality of cells, and transmit a measurement report indicating the average cell quality for each of the plurality of cells and the number of beams associated with each average cell quality.

A non-transitory computer-readable medium for wireless communication is described. The non-transitory computer-readable medium may include instructions operable to cause a processor to measure a quality of a number of beams for each of a plurality of cells, determine an average cell quality for each of the plurality of cells based on the measurement of the number of beams for each of the plurality of cells, and transmit a measurement report indicating the average cell quality for each of the plurality of cells and the number of beams associated with each average cell quality.

Some examples of the method, apparatus, and non-transitory computer-readable medium described herein may further include processes, features, means, or instructions for transmitting an indication of a mobility condition of the UE.

A method of wireless communication is described. The method may include receiving a measurement report from a UE indicating an average cell quality for each of a plurality of cells and a beam quality ratio associated with a number of beams for each of the plurality of cells, where the beam quality ratio indicates a ratio of a maximum beam power and a minimum beam power from the number of beams for each of the plurality of cells, calculating a difference between each average cell quality and a highest average cell quality from among the average cell qualities, and selecting a cell of the plurality of cells for communication based on the calculating the difference between each average cell quality and the highest average cell quality.

An apparatus for wireless communication is described. The apparatus may include means for receiving a measurement report from a UE indicating an average cell quality for each of a plurality of cells and a beam quality ratio associated with a number of beams for each of the plurality of cells, where the beam quality ratio indicates a ratio of a maximum beam power and a minimum beam power from the number of beams for each of the plurality of cells, means for calculating a difference between each average cell quality and a highest average cell quality from among the average cell qualities, and means for selecting a cell of the plurality of cells for communication based on the calculating the difference between each average cell quality and the highest average cell quality.

Another apparatus for wireless communication is described. The apparatus may include a processor, memory in electronic communication with the processor, and instructions stored in the memory. The instructions may be operable to cause the processor to receive a measurement report from a UE indicating an average cell quality for each of a plurality of cells and a beam quality ratio associated with a number of beams for each of the plurality of cells, where the beam quality ratio indicates a ratio of a maximum beam power and a minimum beam power from the number of beams for each of the plurality of cells, calculate a difference between each average cell quality and a highest average cell quality from among the average cell qualities, and select a cell of the plurality of cells for communication based on the calculating the difference between each average cell quality and the highest average cell quality.

A non-transitory computer-readable medium for wireless communication is described. The non-transitory computer-readable medium may include instructions operable to cause a processor to receive a measurement report from a UE indicating an average cell quality for each of a plurality of cells and a beam quality ratio associated with a number of beams for each of the plurality of cells, where the beam quality ratio indicates a ratio of a maximum beam power and a minimum beam power from the number of beams for each of the plurality of cells, calculate a difference between each average cell quality and a highest average cell quality from among the average cell qualities, and select a cell of the plurality of cells for communication based on the calculating the difference between each average cell quality and the highest average cell quality.

Some examples of the method, apparatus, and non-transitory computer-readable medium described herein may further include processes, features, means, or instructions for determining whether a difference between the highest average cell quality and a cell quality for a candidate cell of the plurality of cells may be less than a threshold.

Some examples of the method, apparatus, and non-transitory computer-readable medium described herein may further include processes, features, means, or instructions for selecting the cell of the plurality of cells based on a default cell selection configuration if the difference between the highest average cell quality and the average cell quality for the candidate cell may be greater than the threshold.

Some examples of the method, apparatus, and non-transitory computer-readable medium described herein may further include processes, features, means, or instructions for determining whether the beam quality ratio associated with the highest average cell quality may be less than the beam quality ratio associated with the candidate cell.

Some examples of the method, apparatus, and non-transitory computer-readable medium described herein may further include processes, features, means, or instructions for selecting the cell of the plurality of cells based on a default cell selection configuration if the beam quality ratio associated with the highest average cell quality may be greater than the beam quality ratio associated with the candidate cell.

Some examples of the method, apparatus, and non-transitory computer-readable medium described herein may further include processes, features, means, or instructions for selecting the candidate cell as the cell of the plurality of cells if the beam quality ratio associated with the highest average cell quality may be less than the beam quality ratio associated with the candidate cell.

Some examples of the method, apparatus, and non-transitory computer-readable medium described herein may further include processes, features, means, or instructions for selecting the cell of the plurality of cells for communication based on a mobility condition of the UE.

In some examples of the method, apparatus, and non-transitory computer-readable medium described herein, the maximum beam power and the minimum beam power include a beam reference signal received power (RSRP) measurement.

A method of wireless communication at a UE is described. The method may include measuring a quality of a number of beams for each of a plurality of cells, determining an average cell quality and a beam quality ratio for each of the plurality of cells based on the measurement of the number of beams for each of the plurality of cells, where the beam quality ratio indicates a ratio of a maximum beam quality and a minimum beam quality from the number of beams for each of the plurality of cells, and transmitting a measurement report indicating the average cell quality for each of the plurality of cells and the beam quality ratio associated with each average cell quality.

An apparatus for wireless communication is described. The apparatus may include means for measuring a quality of a number of beams for each of a plurality of cells, means for determining an average cell quality and a beam quality ratio for each of the plurality of cells based on the measurement of the number of beams for each of the plurality of cells, where the beam quality ratio indicates a ratio of a maximum beam quality and a minimum beam quality from the number of beams for each of the plurality of cells, and means for transmitting a measurement report indicating the average cell quality for each of the plurality of cells and the beam quality ratio associated with each average cell quality.

Another apparatus for wireless communication is described. The apparatus may include a processor, memory in electronic communication with the processor, and instructions stored in the memory. The instructions may be operable to cause the processor to measure a quality of a number of beams for each of a plurality of cells, determine an average cell quality and a beam quality ratio for each of the plurality of cells based on the measurement of the number of beams for each of the plurality of cells, where the beam quality ratio indicates a ratio of a maximum beam quality and a minimum beam quality from the number of beams for each of the plurality of cells, and transmit a measurement report indicating the average cell quality for each of the plurality of cells and the beam quality ratio associated with each average cell quality.

A non-transitory computer-readable medium for wireless communication is described. The non-transitory computer-readable medium may include instructions operable to cause a processor to measure a quality of a number of beams for each of a plurality of cells, determine an average cell quality and a beam quality ratio for each of the plurality of cells based on the measurement of the number of beams for each of the plurality of cells, where the beam quality ratio indicates a ratio of a maximum beam quality and a minimum beam quality from the number of beams for each of the plurality of cells, and transmit a measurement report indicating the average cell quality for each of the plurality of cells and the beam quality ratio associated with each average cell quality.

Some examples of the method, apparatus, and non-transitory computer-readable medium described herein may further include processes, features, means, or instructions for transmitting an indication of a mobility condition of the UE.

A method of wireless communication is described. The method may include transmitting configuration signaling indicating a first measurement threshold and a second measurement threshold that is less than the first measurement threshold, receiving a measurement report from a UE indicating a first plurality of average cell quality values and a second plurality of average cell quality values for each of a plurality of cells, where the first plurality of average cell quality values are based on a measurement of a number of beams with a beam quality above the first measurement threshold, and where the second plurality of average cell quality values are based on a measurement of a number of beams with a beam quality above the second measurement threshold, and selecting a cell of the plurality of cells for communication based on the measurement report.

An apparatus for wireless communication is described. The apparatus may include means for transmitting configuration signaling indicating a first measurement threshold and a second measurement threshold that is less than the first measurement threshold, means for receiving a measurement report from a UE indicating a first plurality of average cell quality values and a second plurality of average cell quality values for each of a plurality of cells, where the first plurality of average cell quality values are based on a measurement of a number of beams with a beam quality above the first measurement threshold, and where the second plurality of average cell quality values are based on a measurement of a number of beams with a beam quality above the second measurement threshold, and means for selecting a cell of the plurality of cells for communication based on the measurement report.

Another apparatus for wireless communication is described. The apparatus may include a processor, memory in electronic communication with the processor, and instructions stored in the memory. The instructions may be operable to cause the processor to transmit configuration signaling indicating a first measurement threshold and a second measurement threshold that is less than the first measurement threshold, receive a measurement report from a UE indicating a first plurality of average cell quality values and a second plurality of average cell quality values for each of a plurality of cells, where the first plurality of average cell quality values are based on a measurement of a number of beams with a beam quality above the first measurement threshold, and where the second plurality of average cell quality values are based on a measurement of a number of beams with a beam quality above the second measurement threshold, and select a cell of the plurality of cells for communication based on the measurement report.

A non-transitory computer-readable medium for wireless communication is described. The non-transitory computer-readable medium may include instructions operable to cause a processor to transmit configuration signaling indicating a first measurement threshold and a second measurement threshold that is less than the first measurement threshold, receive a measurement report from a UE indicating a first plurality of average cell quality values and a second plurality of average cell quality values for each of a plurality of cells, where the first plurality of average cell quality values are based on a measurement of a number of beams with a beam quality above the first measurement threshold, and where the second plurality of average cell quality values are based on a measurement of a number of beams with a beam quality above the second measurement threshold, and select a cell of the plurality of cells for communication based on the measurement report.

Some examples of the method, apparatus, and non-transitory computer-readable medium described herein may further include processes, features, means, or instructions for selecting the cell of the plurality of cells for communication based on a mobility condition of the UE.

Some examples of the method, apparatus, and non-transitory computer-readable medium described herein may further include processes, features, means, or instructions for selecting the cell of the plurality of cells from the first plurality of average cell quality values based on the mobility condition of the UE, where the mobility condition of the UE includes a non-mobility condition. Some examples of the method, apparatus, and non-transitory computer-readable medium described herein may further include processes, features, means, or instructions for selecting the cell of the plurality of cells from the second plurality of average cell quality values based on the mobility condition of the UE, where the mobility condition of the UE includes a high mobility condition.

Some examples of the method, apparatus, and non-transitory computer-readable medium described herein may further include processes, features, means, or instructions for transmitting subsequent configuration signaling indicating an adjustment to the first measurement threshold, the second measurement threshold, or both.

In some examples of the method, apparatus, and non-transitory computer-readable medium described herein, the beam quality includes a RSRP measurement.

A method of wireless communication at a UE is described. The method may include receiving configuration signaling indicating a first measurement threshold and a second measurement threshold that is less than the first measurement threshold, determining a first average cell quality for each of a plurality of cells based on a measurement of a number of beams for each of the plurality of cells with a beam quality above the first measurement threshold, determining a second average cell quality for each of the plurality of cells based on a measurement of a number of beams for each of the plurality of cells with a beam quality above the second measurement threshold, and transmitting a measurement report indicating a first plurality of average cell quality values and a second plurality of average cell quality values for each of the plurality of cells, where the first plurality of average cell quality values includes the first average cell quality for each of the plurality of cells, and where the second plurality of average cell quality values includes the second average cell quality for each of the plurality of cells.

An apparatus for wireless communication is described. The apparatus may include means for receiving configuration signaling indicating a first measurement threshold and a second measurement threshold that is less than the first measurement threshold, means for determining a first average cell quality for each of a plurality of cells based on a measurement of a number of beams for each of the plurality of cells with a beam quality above the first measurement threshold, means for determining a second average cell quality for each of the plurality of cells based on a measurement of a number of beams for each of the plurality of cells with a beam quality above the second measurement threshold, and means for transmitting a measurement report indicating a first plurality of average cell quality values and a second plurality of average cell quality values for each of the plurality of cells, where the first plurality of average cell quality values includes the first average cell quality for each of the plurality of cells, and where the second plurality of average cell quality values includes the second average cell quality for each of the plurality of cells.

Another apparatus for wireless communication is described. The apparatus may include a processor, memory in electronic communication with the processor, and instructions stored in the memory. The instructions may be operable to cause the processor to receive configuration signaling indicating a first measurement threshold and a second measurement threshold that is less than the first measurement threshold, determine a first average cell quality for each of a plurality of cells based on a measurement of a number of beams for each of the plurality of cells with a beam quality above the first measurement threshold, determine a second average cell quality for each of the plurality of cells based on a measurement of a number of beams for each of the plurality of cells with a beam quality above the second measurement threshold, and transmit a measurement report indicating a first plurality of average cell quality values and a second plurality of average cell quality values for each of the plurality of cells, where the first plurality of average cell quality values includes the first average cell quality for each of the plurality of cells, and where the second plurality of average cell quality values includes the second average cell quality for each of the plurality of cells.

A non-transitory computer-readable medium for wireless communication is described. The non-transitory computer-readable medium may include instructions operable to cause a processor to receive configuration signaling indicating a first measurement threshold and a second measurement threshold that is less than the first measurement threshold, determine a first average cell quality for each of a plurality of cells based on a measurement of a number of beams for each of the plurality of cells with a beam quality above the first measurement threshold, determine a second average cell quality for each of the plurality of cells based on a measurement of a number of beams for each of the plurality of cells with a beam quality above the second measurement threshold, and transmit a measurement report indicating a first plurality of average cell quality values and a second plurality of average cell quality values for each of the plurality of cells, where the first plurality of average cell quality values includes the first average cell quality for each of the plurality of cells, and where the second plurality of average cell quality values includes the second average cell quality for each of the plurality of cells.

A method of wireless communication at a UE is described. The method may include measuring a quality of a number of beams for each of a plurality of cells, determining an average cell quality for each of the plurality of cells based on the measurement of the number of beams for each of the plurality of cells, determining a beam quality ratio for each of the plurality of cells based on the measurement of the number of beams for each of the plurality of cells, where the beam quality ratio indicates a ratio of a maximum beam power and a minimum beam power from the number of beams for each of the plurality of cells, determining a cell quality offset value for each of the plurality of cells based on the average cell quality for each of the plurality of cells, the beam quality ratio for each of the plurality of cells, or both, and transmitting a measurement report indicating a combination of the average cell quality and the cell quality offset value for each of the plurality of cells.

An apparatus for wireless communication is described. The apparatus may include means for measuring a quality of a number of beams for each of a plurality of cells, means for determining an average cell quality for each of the plurality of cells based on the measurement of the number of beams for each of the plurality of cells, means for determining a beam quality ratio for each of the plurality of cells based on the measurement of the number of beams for each of the plurality of cells, where the beam quality ratio indicates a ratio of a maximum beam power and a minimum beam power from the number of beams for each of the plurality of cells, means for determining a cell quality offset value for each of the plurality of cells based on the average cell quality for each of the plurality of cells, the beam quality ratio for each of the plurality of cells, or both, and means for transmitting a measurement report indicating a combination of the average cell quality and the cell quality offset value for each of the plurality of cells.

Another apparatus for wireless communication is described. The apparatus may include a processor, memory in electronic communication with the processor, and instructions stored in the memory. The instructions may be operable to cause the processor to measure a quality of a number of beams for each of a plurality of cells, determine an average cell quality for each of the plurality of cells based on the measurement of the number of beams for each of the plurality of cells, determine a beam quality ratio for each of the plurality of cells based on the measurement of the number of beams for each of the plurality of cells, where the beam quality ratio indicates a ratio of a maximum beam power and a minimum beam power from the number of beams for each of the plurality of cells, determine a cell quality offset value for each of the plurality of cells based on the average cell quality for each of the plurality of cells, the beam quality ratio for each of the plurality of cells, or both, and transmit a measurement report indicating a combination of the average cell quality and the cell quality offset value for each of the plurality of cells.

A non-transitory computer-readable medium for wireless communication is described. The non-transitory computer-readable medium may include instructions operable to cause a processor to measure a quality of a number of beams for each of a plurality of cells, determine an average cell quality for each of the plurality of cells based on the measurement of the number of beams for each of the plurality of cells, determine a beam quality ratio for each of the plurality of cells based on the measurement of the number of beams for each of the plurality of cells, where the beam quality ratio indicates a ratio of a maximum beam power and a minimum beam power from the number of beams for each of the plurality of cells, determine a cell quality offset value for each of the plurality of cells based on the average cell quality for each of the plurality of cells, the beam quality ratio for each of the plurality of cells, or both, and transmit a measurement report indicating a combination of the average cell quality and the cell quality offset value for each of the plurality of cells.

Some examples of the method, apparatus, and non-transitory computer-readable medium described herein may further include processes, features, means, or instructions for determining the cell quality offset value for each of the plurality of cells based on a mobility condition of the UE.

DETAILED DESCRIPTION

Figure 1:
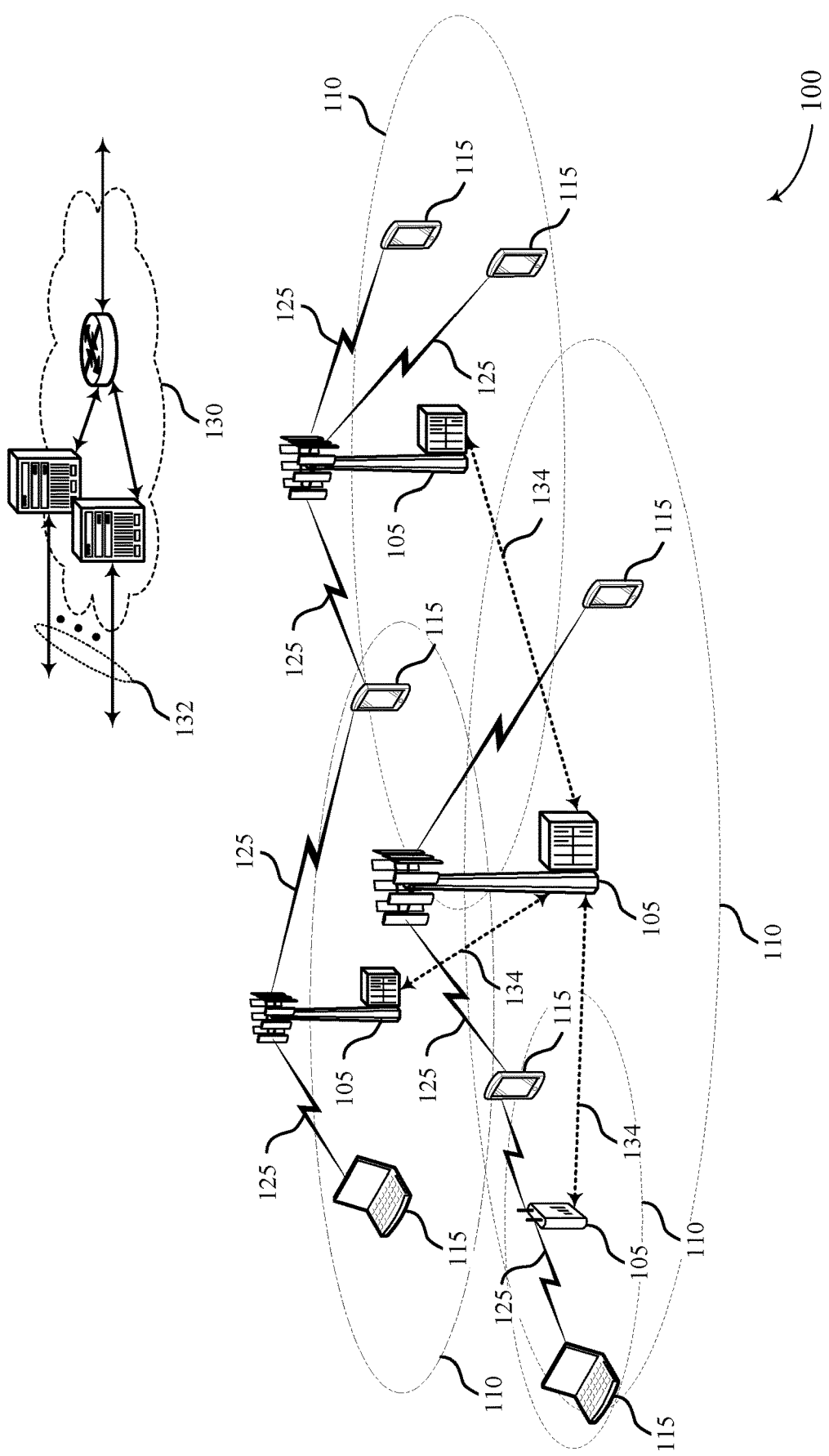
FIG. 1 illustrates an example of a system for wireless communication that supports cell quality measurement reporting for cells with mismatched beam numbers in accordance with aspects of the present disclosure.

Some wireless communications systems may utilize beamforming techniques for transmitting and receiving information between a base station and a user equipment (UE). In some cases, the UE may receive information on one or more beams from more than one cell. For example, the UE may be located in coverage areas of multiple cells or base stations or may move into a coverage area of an additional base station. As such, a base station may determine which cell the UE communicates with based on a measured characteristic by the UE for beams associated with each cell. In some cases, the UE may measure a power value for each beam and calculate an average beam power for each cell based on the beams transmitted from each base station, where beams above an absolute threshold are included in the calculation. The UE may transmit these calculated average beam powers to a serving base station in a beam measurement report, and the serving base station may determine a cell for communications with the UE based on which cell has the highest average beam power. However, basing the cell selection on an average power calculation alone may not take other characteristics associated with the beams from each cell into consideration (e.g., the number of beams from each cell, a range of beam powers for each cell, etc.).

As described herein, a UE may include indications of characteristics associated with the beams from each cell in addition to a beam power average in a beam measurement report. A base station may use this additional information to more efficiently select a cell for communications, as compared to selecting a cell based on average beam power measurements alone. In one example, the UE may report a number indicating how many beams are used when calculating the average beam power for each cell. In another example, the UE may report a ratio between a maximum and minimum beam power for each cell along with the average beam power in the beam measurement report. In each case, a base station may utilize this information, in addition to other information such as the average beam power for each cell and a mobility condition of the UE, to select a cell for communications.

In yet another example, the UE may report two average beam powers based on two different power thresholds, where a first average beam power may include beams above an upper threshold and a second average beam power may include beams above a lower threshold. Based on a mobility condition of the UE, a cell with a higher first average or a higher second average may be chosen. For example, a cell with the higher first average may be chosen for a non-mobile UE, while a cell with the higher second average may be chosen for a mobile UE.

In another example, the UE may add a bias to a reported measurement value (e.g., an average beam power) for a particular cell to indicate a higher preference for that cell over the other candidates. For example, a mobile UE may add a bias value to the average beam power for a cell with a higher number of beams to increase the likelihood that this cell is chosen for communications. Alternatively, a non-mobile UE may add a bias value to the average beam power for a cell with a higher ratio between a maximum and minimum beam power to increase the likelihood that this cell is chosen for communications.

Aspects of the disclosure are initially described in the context of a wireless communications system. An additional wireless communications system, examples of how an average beam power is determined, and flowcharts describing a cell selection process are then provided to illustrate aspects of the disclosure. Aspects of the disclosure are further illustrated by and described with reference to apparatus diagrams, system diagrams, and flowcharts that relate to cell quality measurement reporting for cells with mismatched beam numbers.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

As described herein, wireless communications system 100 may employ beamforming techniques for communications between a UE 115 and a base station 105. In some cases, the UE 115 may receive one or more beams from one or more base stations 105 (i.e., multiple beams from each base station 105). For example, the UE 115 may be in multiple coverage areas 110 of corresponding base stations 105, including a serving base station 105, and receive beams from each base station 105. Additionally or alternatively, the UE 115 may communicate with the serving base station 105 initially and move into a coverage area 110 of a second base station 105 and receive beams from both base stations 105. In some cases, it may be beneficial for the UE 115 to communicate with one base station 105 over the other base stations 105. In order to determine which base station 105 to communicate with, the UE 115 may measure a power for each beam and then calculate an average beam power for each base station 105 (e.g., a cell quality). The UE 115 may transmit these calculated average beam powers to the serving base station 105 as part of a beam measurement report. The serving base station 105 may determine a base station 105 for communication with the UE 115 based on which base station 105 has the highest calculated average beam power. However, determining a base station 105 based on an average beam power may lead to a chosen base station 105 for communications with the UE 115 that has fewer beams or less optimal beams in comparison to the other base stations 105.

Wireless communications system 100 may support efficient techniques for selecting a cell from a plurality of cells for communications with a UE 115 based on one or more reported characteristics of beams from each cell. The UE 115 may include the one or more characteristics in a beam measurement report transmitted to a base station 105. In some examples, the UE 115 may report a number indicating how many beams are used when calculating the average beam power for each cell. In some examples, the UE 115 may report a ratio between a maximum and minimum beam power for each cell along with the average beam power in the beam measurement report. In some examples, the UE 115 may report two average beam powers based on two defined thresholds, where a first average beam power may include beams above an upper threshold and a second average beam power may include beams above a lower threshold. In yet other examples, the UE 115 may add a bias to a measured value for a particular cell to indicate a higher preference for that cell over another, and the base station 105 may choose that cell based on the added bias. The base station 105 may consider these additional reported characteristics for selecting the optimal beam for the UE 115 and thus may avoid selecting a sub-optimal beam based on average beam power alone.

Figure 2:
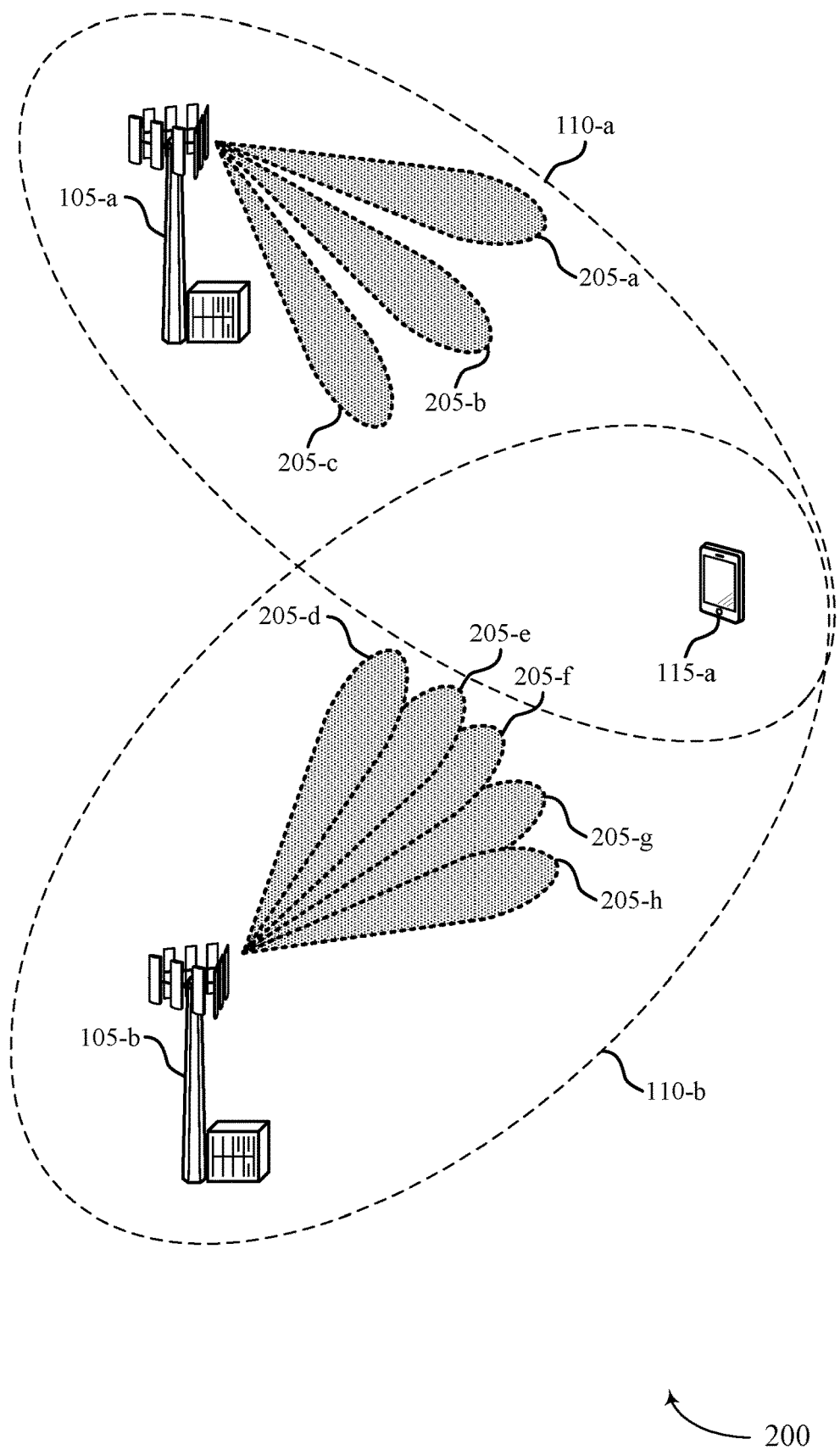
FIG. 2 illustrates an example of a wireless communications system that supports cell quality measurement reporting for cells with mismatched beam numbers in accordance with aspects of the present disclosure.

FIG. 2 illustrates an example of a wireless communications system 200 that supports cell quality measurement reporting for cells with mismatched beam numbers in accordance with various aspects of the present disclosure. In some examples, wireless communications system 200 may implement aspects of wireless communications system 100. Wireless communications system 200 may include a base station 105-a, a base station 105-b, and a UE 115-a, which may be examples of respective devices as described with reference to FIG. 1. As described herein, base stations 105-a and 105-b may include one or more cells. In the following examples, techniques for selecting a particular base station 105 for communications with a UE 115 are described. It is to be understood that these techniques also apply to selecting a particular cell of a base station 105. While two (2) base stations 105 are shown in the example of wireless communications system 200, it is to be understood that UE 115-a may receive beams 205 from additional base stations 105. In some cases, UE 115-a may initially communicate with base station 105-a in a corresponding coverage area 110-a and may also be located in or move into coverage area 110-b associated with base station 105-b. As such, UE 115-a may receive beams 205-a, 205-b, and 205-c from base station 105-a and beams 205-d, 205-e, 205-f, 205-g, and 205-h from base station 105-b. While three (3) beams 205 are shown for base station 105-a and five (5) beams 205 are shown for base station 105-b, it is to be understood that each base station 105 may transmit more or fewer beams 205.

UE 115-a may measure a power of each beam 205 and calculate an average beam power (e.g., cell quality) for each base station 105. For example, UE 115-a may calculate the average beam power for base station 105-a based on the power of beams 205-a, 205-b, and 205-c. Additionally, UE 115-a may calculate the average beam power for base station 105-b based on the powers of beams 205-d, 205-e, 205-f, 205-g, and 205-h. In some cases, UE 115-a may include beams 205 that are above a threshold power level when calculating the average beam power for each base station 105. For example, beams 205-a and 205-f may fall below the threshold power level and, therefore, UE 115-a may not include their powers when calculating the average beam power for their respective base stations 105. UE 115-a may include the average beam powers for each base station 105 in a beam measurement report transmitted to base station 105-a. The beam measurement report may enable base station 105-a to determine which base station 105 should communicate with UE 115-a. As described herein, UE 115-a may include additional characteristics in the beam measurement report to better enable base station 105-a to determine the base station 105 (or cell) for communications with UE 115-a.

In some cases, UE 115-a may include a number indicating the number of beams used in the average beam power calculation (i.e., $N_{used}$) in the beam measurement report for each base station 105 along with the average beam power for each base station 105. For example, in the scenario described herein, UE 115-a may not include beams 205-a and 205-f in the average beam power calculation because the beams fall below a threshold power level. Therefore, UE 115-a may transmit an indication that two (2) beams 205 were used in the average beam calculation for base station 105-a and an indication that four (4) beams 205 were used in the average beam power calculation for base station 105-b. Base station 105-a may receive the beam measurement report from UE 115-a that includes the average beam power and number of beams used for the average beam power calculation for each base station 105.

If the difference between the average beam powers for each base station 105 falls below a threshold associated with the average beam power difference, base station 105-a may determine the base station 105 for communications with UE 115-a based on the number of beams used for the average beam power calculation. For example, base station 105-a may have a higher average beam power than base station 105-b. However, the difference between the two calculated average beam powers is below the threshold associated with the average beam power difference. Therefore, base station 105-a may determine that base station 105-b should communicate with UE 115-a since the average beam power for base station 105-b was calculated using four (4) beams 205 versus two (2) beams 205 used for the average beam power of base station 105-a.

Additionally or alternatively, if the number of beams 205 used for the average beam power calculation is the same for each base station or the difference between the calculated average beam powers for each base station exceeds the threshold associated with the average beam power difference, base station 105-a may determine the base station 105 based on which base station 105 has the highest average beam power. UE 115-a may include the number of beams used for the average beam power calculation in the beam measurement report if UE 115-a is in a high mobility condition. The number of beams may indicate which base station 105 has a higher flexibility of resources, which may be desirable for high mobility UEs 115 since there are more beams for possible communications.

In some cases, UE 115-a may include a ratio between a maximum and minimum beam power (e.g., a maximum and minimum reference signal received power (RSRP)) for each base station 105 in the beam measurement report to base station 105-a for each base station 105 along with the average beam power for each base station 105. For example, UE 115-a may include a ratio of beam 205-b and beam 205-c for base station 105-a in the beam measurement report, where beam 205-b has a maximum beam power and beam 205-c has a minimum beam power with regards to base station 105-a. Similarly, UE 115-a may include a ratio of beam 205-e and beam 205-h for base station 105-b in the beam measurement report, where beam 205-e has a maximum beam power and beam 205-h has a minimum beam power with regards to base station 105-b. In some cases, the ratio for base station 105-a may be higher than the ratio for base station 105-b.

If the difference between the average beam powers for each base station 105 falls below a threshold associated with the average beam power difference, base station 105-a may determine the base station 105 for communications with UE 115-a based on the ratio between the maximum and minimum beam powers and a mobility condition. For example, base station 105-b may have a higher average beam power than base station 105-a. However, the difference between the two calculated average beam powers is below the threshold associated with the average beam power difference, and UE 115-a may be non-mobile (e.g., stationary). Therefore, base station 105-a may determine that it should communicate with UE 115-a since its ratio is higher than the ratio for base station 105-*b*. Additionally or alternatively, if the difference between the calculated average beam powers for each base station exceeds the threshold associated with the average beam power difference or the ratio for the base station 105 with the highest average beam power is also the highest ratio, base station 105-*a* may determine the base station 105 based on which base station 105 has the highest average beam power.

In some cases, UE 115-*a* may report two average beam powers based on two defined thresholds for each base station 105 in the beam measurement report transmitted to base station 105-*a*, where a first average beam power may include beams above an upper threshold in the average calculation and a second average beam power may include beams above a lower threshold in the average calculation. In some cases, base station 105-*a* may have a higher first average beam power, and base station 105-*b* may have a higher second average beam power. Based on a mobility condition of UE 115-*a*, base station 105-*a* may determine a base station 105 with a higher first average or a higher second average for communications with UE 115-*a*. For example, base station 105-*a* may choose base station 105-*a* (e.g., with the higher first average) if UE 115-*a* is non-mobile, while base station 105-*b* (e.g., with the higher second average) may be chosen if UE 115-*a* is mobile. Additionally, base station 105-*a* may adjust the upper and lower thresholds.

In some cases, UE 115-*a* may add a bias (e.g., delta value) to the average beam power reported in the beam measurement report to base station 105-*a* for each base station 105 to indicate a higher preference for one base station 105 over another. Additionally, UE 115-*a* may know the number of beams used for the average beam power calculation for each base station 105, the ratio between the maximum and minimum beam power for each base station 105, a variance of RSRP from different beams for each base station 105, etc. For example, base station 105-*b* may have the higher number of beams used for the average beam power calculation, and base station 105-*a* may have the higher ratio between the maximum and minimum beam powers. Additionally, the difference between the two calculated average beam powers for each base station 105 is below a threshold associated with the average beam power difference. Accordingly, if UE 115-*a* is mobile, it may add a bias value to the average beam power for base station 105-*b* (e.g., the higher number of beams used for the average beam power calculation) to increase the likelihood that base station 105-*a* chooses base station 105-*b* for communications. Alternatively, if UE 115-*a* is non-mobile, it may add a bias value to the average beam power for base station 105-*a* (e.g., the higher ratio between a maximum and minimum beam power) to increase the likelihood that base station 105-*a* chooses itself for communications.

The techniques for beam power reporting and cell selection described herein allow for the base station 105 to select an optimal beam for communicating with a UE 115. Rather than relying only on average beam power, which may result in selection of a sub-optimal beam, the base station 105 utilizes different beam characteristics, as well as a condition associated with the UE 115, to increase the likelihood of selecting an optimal beam for communication with the UE 115.

Figure 3A:
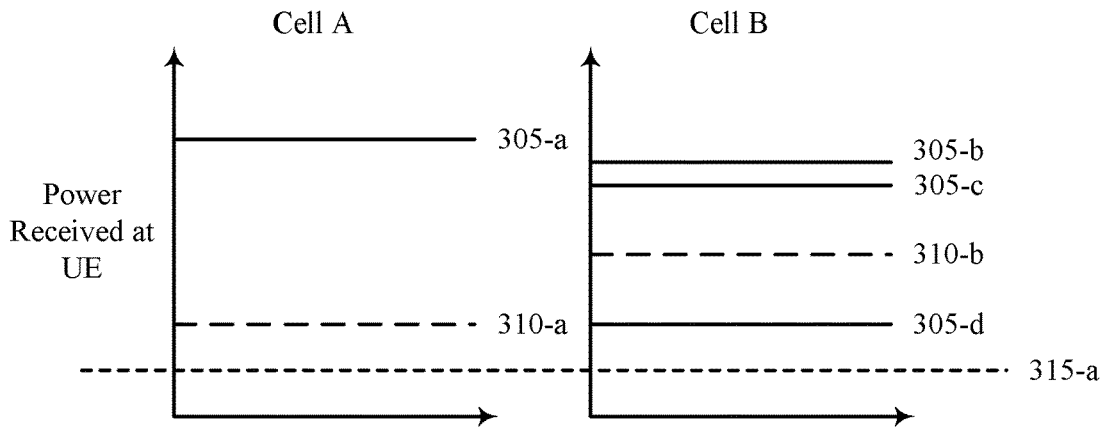
FIGS. 3A, 3B, and 3C illustrate examples of average beam power determinations that support cell quality measurement reporting for cells with mismatched beam numbers in accordance with aspects of the present disclosure.

FIG. 3A illustrates an example of an average beam power determination 300 that supports cell quality measurement reporting for cells with mismatched beam numbers in accordance with various aspects of the present disclosure. In some examples, average beam power determination 300 may implement aspects of wireless communications systems 100 and 200. Average beam power determination 300 may include beam power measurements 305 and an average beam power 310 for a Cell A and a Cell B. In some cases, Cell A and Cell B may correspond to base stations 105 as described with reference to FIGS. 1 and 2. A UE 115 may include average beam powers 310 for each cell in a beam measurement report that is transmitted to a serving cell (e.g., a serving base station 105). The UE 115 may include beam power measurements 305 above an absolute threshold 315-*a* when calculating each average beam power 310 for Cell A and Cell B.

As shown in average beam power determination 300, average beam power 310-*b* for Cell B may be higher than average beam power 310-*a* for Cell A. In some cases, the serving cell may indicate that the UE 115 should include three (3) beam power measurements in the average beam power calculation. As such, since Cell A has one (1) beam power measurement above absolute threshold 315-*a* (i.e., beam power measurement 305-*a*), the average beam power 310-*a* may be affected when beam power measurement 305-*a* is averaged with two (2) zero powers. Alternatively, Cell B may include three (3) beam power measurements above absolute threshold 315-*a* (i.e., beam power measurements 305-*b*, 305-*c*, and 305-*d*) and may calculate average beam power 310-*b* appropriately. However, beam power measurement 305-*a* for Cell A may be greater than the beam power measurements 305 for Cell B, and it may be desirable that the UE 115 communicates with Cell A on a beam corresponding to beam power measurement 305-*a*. For example, if the UE 115 is non-mobile (i.e., stationary), the beam corresponding to beam power measurement 305-*a* may represent a strongest connection for the UE 115.

In some cases, the UE 115 may include a ratio between a maximum and minimum beam power in the beam measurement report as described herein with reference to FIG. 2. Accordingly, Cell A may have a higher ratio than Cell B, and if the difference between average beam powers 310-*a* and 310-*b* is below a threshold value associated with the average beam power difference, the serving cell may choose Cell A for communications with the UE 115 based on the higher ratio.

Additionally or alternatively, the UE 115 may include two average beam powers based on two defined thresholds for each cell in the beam measurement report transmitted to the serving cell as described herein with reference to FIG. 2, where a first average beam power may include beams above an upper threshold in the average calculation, and a second average beam power may include beams above a lower threshold in the average calculation. Accordingly, Cell A may have a higher first average beam power above the upper threshold than Cell B, and the serving cell may choose Cell A for communications with the UE 115 based on the higher first average beam power.

Additionally or alternatively, the UE 115 may add a bias to average beam power 310-*a* as described herein with reference to FIG. 2. The added bias may result in average beam power 310-*a* being greater than average beam power 310-*b* in the beam measurement report. Consequently, the serving cell may choose Cell A for communications with the UE 115 since it has a higher average beam power 310 as reported in the beam measurement report.

In some cases, if the difference between average beam power 310-*c* and 310-*d* is above the threshold value associated with the average beam power difference, the serving cell may determine the cell for communications with the UE 115 based on which cell has the higher average beam power 310.

Figure 3B:
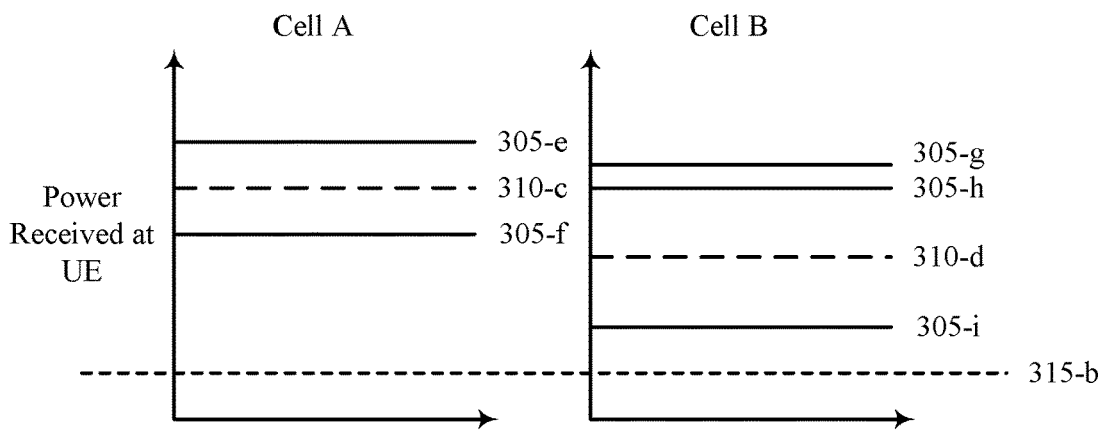

FIG. 3B illustrates an example of an average beam power determination 301 that supports cell quality measurement reporting for cells with mismatched beam numbers in accordance with various aspects of the present disclosure. In some examples, average beam power determination 301 may implement aspects of wireless communications systems 100 and 200. Average beam power determination 301 may include beam power measurements 305 and an average beam power 310 for a Cell A and a Cell B. In some cases, Cell A and Cell B may correspond to base stations 105 as described with reference to FIGS. 1 and 2. A UE 115 may include average beam powers 310 for each cell in a beam measurement report that is transmitted to a serving cell (e.g., a serving base station 105). The UE 115 may include beam power measurements 305 above an absolute threshold 315-$b$ when calculating each average beam power 310 for Cell A and Cell B.

As shown in average beam power determination 301, average beam power 310-$c$ for Cell A may be higher than average beam power 310-$d$ for Cell B. Cell A may calculate average beam power 310-$c$ based on beam power measurements 305-$e$ and 305-$f$, and Cell B may calculate average beam power 310-$d$ based on beam power measurements 305-$g$, 305-$h$, and 305-$i$. In some cases, while Cell B has a lower average beam power 310 than Cell A, it may be desirable for the UE 115 to communicate with Cell B. For example, a cell with a higher number of beam power measurements 305 used for calculating the average beam power 310 may indicate a higher number of beams for possible communications, which is desirable for high mobility scenarios.

In some cases, the UE 115 may be in a high mobility scenario and include a number indicating the number of beam power measurements 305 used in the average beam power calculation (i.e., $N_{used}$) in the beam measurement report to the serving cell as described herein with reference to FIG. 2. Accordingly, the UE 115 may indicate that two (2) beam power measurements 305 were used to calculate average beam power 310-$c$ and three (3) beam power measurements 305 were used to calculate average beam power 310-$d$. Based on the number of beam power measurements used and if the difference between average beam power 310-$c$ and average beam power 310-$d$ is below a threshold value associated with the average beam power difference, the serving cell may choose Cell B for communications with the UE 115.

Additionally or alternatively, the UE 115 may include two average beam powers based on two defined thresholds for each cell in the beam measurement report transmitted to the serving cell as described herein with reference to FIG. 2, where a first average beam power may include beams above an upper threshold in the average calculation and a second average beam power may include beams above a lower threshold in the average calculation. Accordingly, Cell B may have a higher second average beam power above the lower threshold than Cell A, and the serving cell may choose Cell B for communications with the UE 115 based on the higher second average beam power.

Additionally or alternatively, the UE 115 may add a bias to average beam power 310-$d$ as described herein with reference to FIG. 2. The added bias may result in average beam power 310-$d$ being greater than average beam power 310-$c$ in the beam measurement report. Consequently, the serving cell may choose Cell B for communications with the UE 115 since it has a higher average beam power 310 as reported in the beam measurement report.

In some cases, if the difference between average beam power 310-$c$ and 310-$d$ is above the threshold value associated with the average beam power difference, the serving cell may determine the cell for communications with the UE 115 based on which cell has the higher average beam power 310.

Figure 3C:
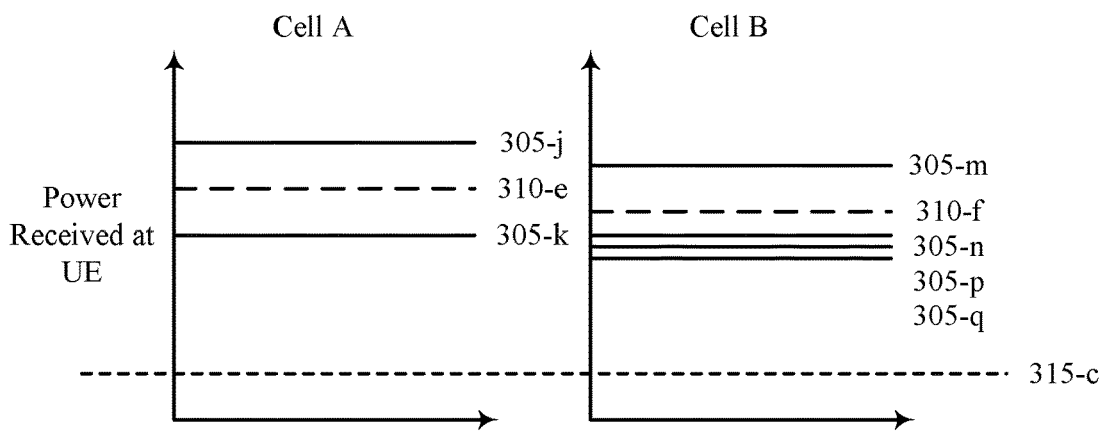

FIG. 3C illustrates an example of an average beam power determination 302 that supports cell quality measurement reporting for cells with mismatched beam numbers in accordance with various aspects of the present disclosure. In some examples, average beam power determination 302 may implement aspects of wireless communications systems 100 and 200. Average beam power determination 302 may include beam power measurements 305 and an average beam power 310 for a Cell A and a Cell B. In some cases, Cell A and Cell B may correspond to base stations 105 as described with reference to FIGS. 1 and 2. A UE 115 may include average beam powers 310 for each cell in a beam measurement report that is transmitted to a serving cell (e.g., a serving base station 105). The UE 115 may include beam power measurements 305 above an absolute threshold 315-$c$ when calculating each average beam power 310 for Cell A and Cell B.

As shown in average beam power determination 302, average beam power 310-$e$ for Cell A may be higher than average beam power 310-$f$ for Cell B. Cell A may calculate average beam power 310-$e$ based on beam power measurements 305-$j$ and 305-$k$, and Cell B may calculate average beam power 310-$f$ based on beam power measurements 305-$m$, 305-$n$, 305-$p$, and 305-$q$. In some cases, while Cell B has a lower average beam power 310 than Cell A, it may be desirable for the UE 115 to communicate with Cell B. For example, a cell with a higher number of beam power measurements 305 used for calculating the average beam power 310 may indicate a higher number of beams for possible communications, which is desirable for high mobility scenarios.

In some cases, the UE 115 may be in a high mobility scenario and include a number indicating the number of beam power measurements 305 used in the average beam power calculation (i.e., $N_{used}$) in the beam measurement report to the serving cell as described herein with reference to FIG. 2. Accordingly, the UE 115 may indicate that two (2) beam power measurements 305 were used to calculate average beam power 310-$e$ and four (4) beam power measurements 305 were used to calculate average beam power 310-$f$. Based on the number of beam power measurements used and if the difference between beam average power 310-$e$ and average beam power 310-$f$ is below a threshold value associated with the average beam power difference, the serving cell may choose Cell B for communications with the UE 115.

Additionally or alternatively, the UE 115 may include two average beam powers based on two defined thresholds for each cell in the beam measurement report transmitted to the serving cell as described herein with reference to FIG. 2, where a first average beam power may include beams above an upper threshold in the average calculation and a second average beam power may include beams above a lower threshold in the average calculation. Accordingly, Cell B may have a higher second average beam power above the lower threshold than Cell A, and the serving cell may choose Cell B for communications with the UE 115 based on the higher second average beam power.

Additionally or alternatively, the UE 115 may add a bias to average beam power 310-$f$ as described herein with reference to FIG. 2. The added bias may result in average beam power 310-*f* being greater than average beam power 310-*e* in the beam measurement report. Consequently, the serving cell may choose Cell B for communications with the UE 115 since it has a higher average beam power 310 as reported in the beam measurement report.

In some cases, if the difference between average beam power 310-*e* and 310-*f* is above the threshold value associated with the average beam power difference, the serving cell may determine the cell for communications with the UE 115 based on which cell has the higher average beam power 310.

Figure 4:
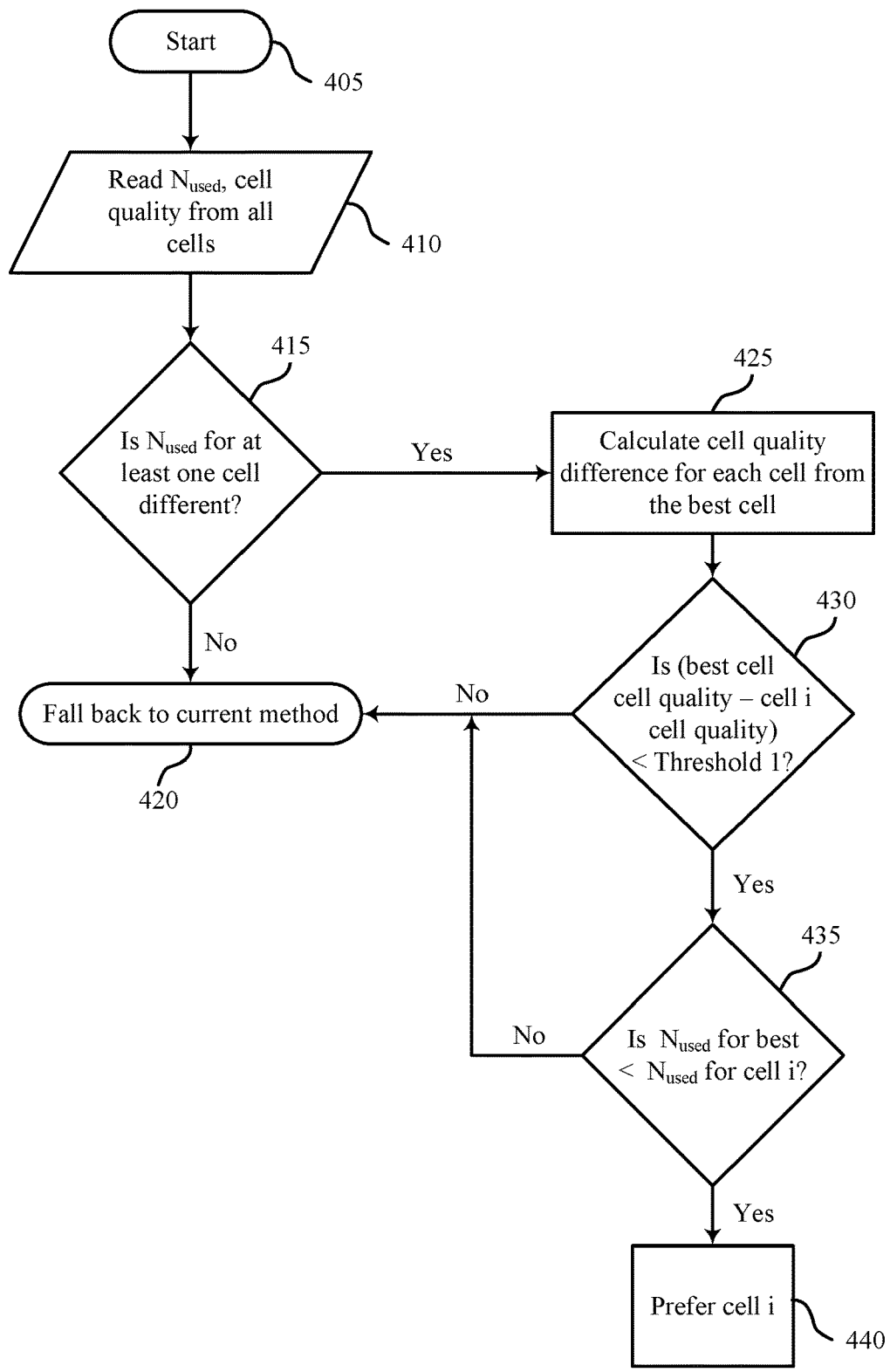
FIGS. 4 and 5 illustrate examples of cell selection flowcharts that support cell quality measurement reporting for cells with mismatched beam numbers in accordance with aspects of the present disclosure.

FIG. 4 illustrates an example of a cell selection flowchart 400 that supports cell quality measurement reporting for cells with mismatched beam numbers in accordance with various aspects of the present disclosure. In some examples, cell selection flowchart 400 may implement aspects of wireless communications systems 100 and 200. Cell Selection flowchart 400 may include a serving cell (e.g., serving base station 105) determining a cell for communications with a UE 115 based on a number of beams used in an average beam power calculation (i.e., $N_{used}$) as described herein with reference to FIGS. 2, 3B, and 3C. In some cases, the UE 115 may be a in a high mobility scenario.

At 405, the serving cell may start the determination. At 410, the serving cell may receive $N_{used}$ and cell qualities (e.g., average beam power) from all cells. In some cases, the $N_{used}$ and cell qualities may be received in a beam measurement report transmitted by the UE 115.

At 415, the serving cell may determine whether $N_{used}$ is different for at least one of the cells than the $N_{used}$ for the cell with the best cell quality. If the serving cell determines that $N_{used}$ is the same for all the cells, the serving cell may fall back to a current method at 420 and select the cell for communications with the UE 115 based on which cell has the best cell quality (e.g., highest average beam power). Alternatively, if the serving cell determines that at least one cell has a different $N_{used}$ than the cell with the best cell quality, the serving cell may calculate a cell quality difference between the at least one cell and the cell with the best cell quality (e.g., difference between beam average powers) at 425.

At 430, the serving cell may determine whether the cell quality difference calculated at 425 is below a threshold 1 (e.g., a threshold value associated with the average beam power difference). If the serving cell determines that the cell quality difference exceeds the threshold 1, the serving cell may fall back to the current method at 420 and select the cell for communications with the UE 115 based on which cell has the best cell quality.

Alternatively, if the serving cell determines that the cell quality difference is below the threshold 1, the serving cell may determine if $N_{used}$ for the cell with the best quality is less than $N_{used}$ for the at least one cell determined at 415 with a different $N_{used}$ than $N_{used}$ for the cell with the best cell quality at 435. If $N_{used}$ for the cell with the best cell quality is greater than $N_{used}$ for the at least one cell, the serving cell may fall back to the current method at 420. Alternatively, if $N_{used}$ for the cell with the best cell quality is less than $N_{used}$ for the at least one cell, the serving cell may prefer the at least one cell for communications with the UE 115 at 440.

Figure 5:
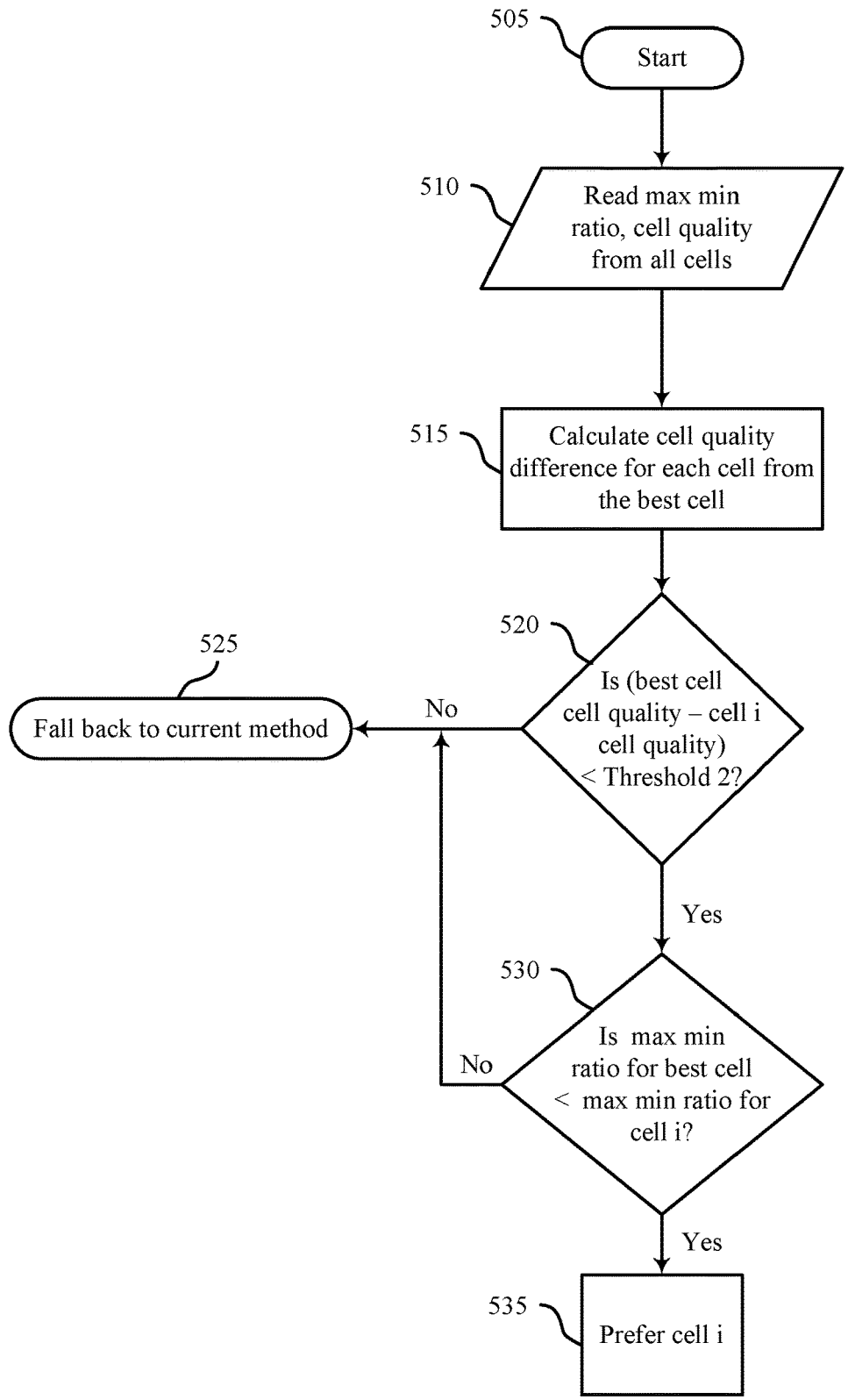

FIG. 5 illustrates an example of a cell selection flowchart 500 that supports cell quality measurement reporting for cells with mismatched beam numbers in accordance with various aspects of the present disclosure. In some examples, cell selection flowchart 500 may implement aspects of wireless communications systems 100 and 200. Cell Selection flowchart 500 may include a serving cell (e.g., serving base station 105) determining a cell for communications with a UE 115 based on a ratio between a maximum and minimum beam power (i.e., max min ratio) as described herein with reference to FIGS. 2 and 3A. In some cases, the UE 115 may be non-mobile.

At 505, the serving cell may start the determination. At 510, the serving cell may receive max min ratios and cell qualities (e.g., average beam power) from all cells. In some cases, the max min ratios and cell qualities may be received in a beam measurement report transmitted by the UE 115.

At 515, the serving cell may calculate a cell quality difference between each cell and the cell with the best cell quality (e.g., difference between beam average powers). At 520, the serving cell may determine whether the cell quality difference calculated at 515 is below a threshold 2 (e.g., a threshold value associated with the average beam power difference). If the serving cell determines that the cell quality difference exceeds the threshold 2, the serving cell may fall back to a current method at 525 and select the cell for communications with the UE 115 based on which cell has the best cell quality.

Alternatively, if the serving cell determines that the cell quality difference is below the threshold 2, the serving cell may then determine whether the max min ratio for the cell with the best cell quality is less than a max min ratio for another cell at 530. If the max min ratio for the cell with the best cell quality is greater than the max min ratio for the other cell, the serving cell may fall back to the current method at 525. Alternatively, if the min ratio for the cell with the best cell quality is less than the max min ratio for the other cell, the serving cell may prefer the other cell at 535. As such, the serving cell may indicate that it may be desirable for the UE 115 to communicate with the preferred other cell.

Figure 6:
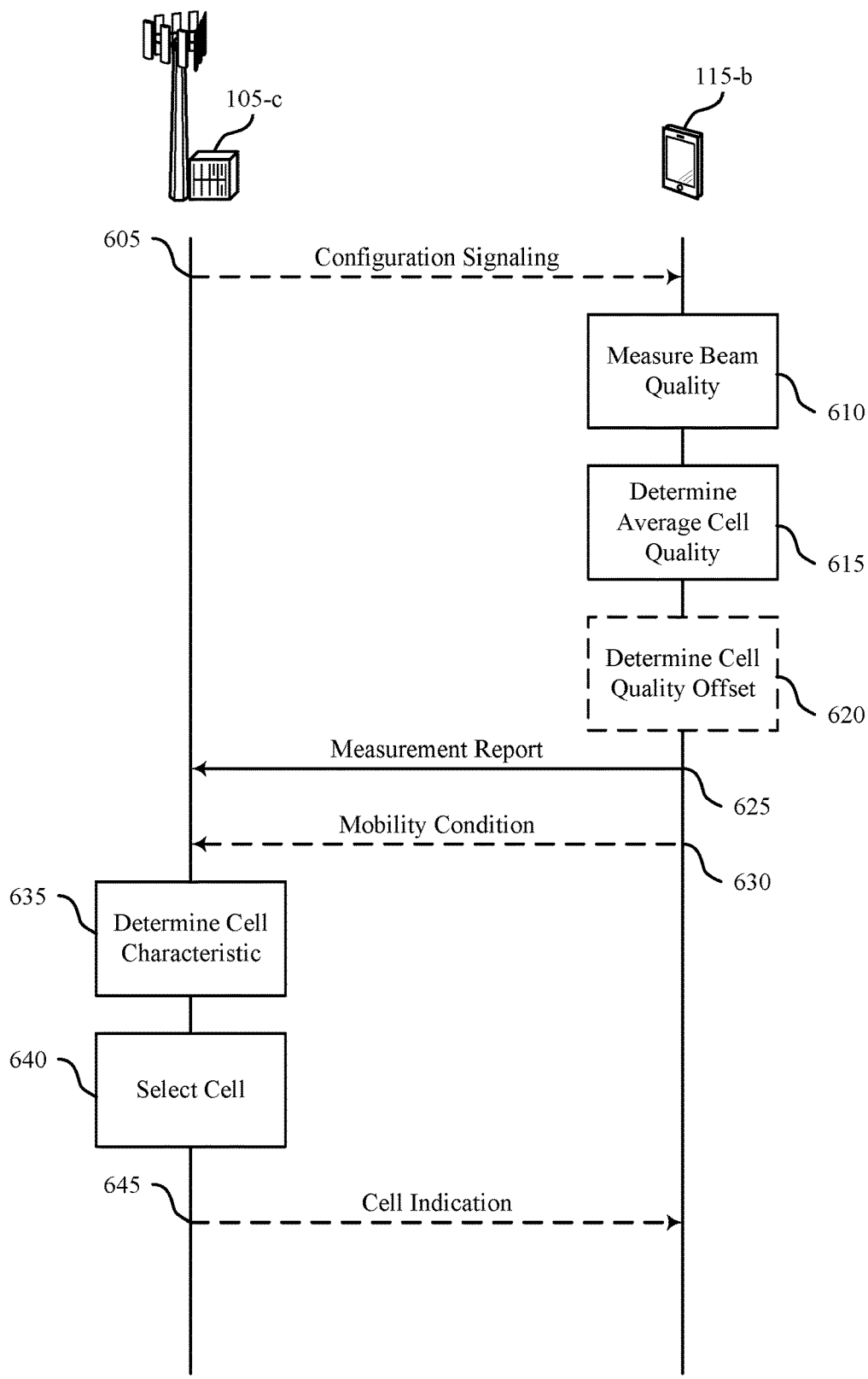
FIG. 6 illustrates an example of a process flow that supports cell quality measurement reporting for cells with mismatched beam numbers in accordance with aspects of the present disclosure.

FIG. 6 illustrates an example of a process flow 600 that supports cell quality measurement reporting for cells with mismatched beam numbers in accordance with various aspects of the present disclosure. In some examples, process flow 600 may implement aspects of wireless communications systems 100 and 200. Process flow 600 may include a base station 105-*c* and a UE 115-*b*, which may be examples of corresponding devices as described with reference to FIGS. 1-5. Base station 105-*c* may determine a base station 105 (e.g., a cell) with which UE 115-*b* may communicate.

In the following description of the process flow 600, the operations between UE 115-*b* and base station 105-*c* may be performed in different orders or at different times. Certain operations may also be left out of process flow 600, or other operations may be added to process flow 600. It is to be understood that while a base station 105 and a UE 115 are shown performing a number of the operations of process flow 600, any transmitting or receiving device may perform the operations shown.

At 605, base station 105-*c* may transmit configuration signaling indicating a first measurement threshold and a second measurement threshold that is less than the first measurement threshold to UE 115-*b*.

At 610, UE 115-*b* may measure a quality of a number of beams (e.g., beam power) for each of a plurality of cells. At 615, UE 115-*b* may determine an average cell quality for each of the plurality of cells based on the measurement of the number of beams for each of the plurality of cells. In some cases, UE 115-*b* may determine a beam quality ratio for each of the plurality of cells based on the measurement of the number of beams for each of the plurality of cells, where the beam quality ratio indicates a ratio of a maximum beam quality and a minimum beam quality from the number of beams for each of the plurality of cells. Additionally, UE 115-*b* may determine a first average cell quality for each of a plurality of cells based on a measurement of a number of beams for each of the plurality of cells with a beam quality above the first measurement threshold and a second average cell quality for each of the plurality of cells based on a measurement of a number of beams for each of the plurality of cells with a beam quality above the second measurement threshold. In some cases, the maximum beam power, the minimum beam power, and the beam quality may include a beam RSRP measurement.

At 620, UE 115-*b* may determine a cell quality offset value (e.g., bias or delta value) for each of the plurality of cells based on the average cell quality for each of the plurality of cells, the beam quality ratio for each of the plurality of cells, or both. In some cases, UE 115-*b* may determine the cell quality offset value for each of the plurality of cells based on a mobility condition of itself.

At 625, UE 115-*b* may transmit a measurement report indicating the average cell quality for each of the plurality of cells and the number of beams associated with each average cell quality. In some cases, the measurement report may further include the beam quality ratio associated with each average cell quality. Additionally or alternatively, the measurement report may include a first plurality of average cell quality values and a second plurality of average cell quality values for each of the plurality of cells, where the first plurality of average cell quality values includes the first average cell quality for each of the plurality of cells, and where the second plurality of average cell quality values includes the second average cell quality for each of the plurality of cells. In some cases, UE 115-*b* may transmit the measurement report indicating a combination of the average cell quality and the cell quality offset value for each of the plurality of cells. At 630, UE 115-*b* may transmit an indication of a mobility condition of itself.

At 635, base station 105-*c* may determine a characteristic of each of the plurality of cells based on the received measurement report. In some cases, base station 105-*c* may determine whether the number of beams associated with each average cell quality is the same. Additionally, base station 105-*c* may calculate a difference between each average cell quality and a highest average cell quality from among the average cell qualities if the number of beams associated with each average cell quality is not the same. Base station 105-*c* may then determine whether a difference between the highest average cell quality and a cell quality for a candidate cell of the plurality of cells is less than a threshold. If the difference between the highest average cell quality and the average cell quality for the candidate cell is less than the threshold, base station 105-*c* may determine whether the number of beams associated with the highest average cell quality is less than the number of beams associated with the average cell quality for the candidate cell. Additionally or alternatively, base station 105-*c* may determine whether the beam quality ratio associated with the highest average cell quality is less than the beam quality ratio associated with the candidate cell.

At 640, base station 105-*c* may select a cell for communications with UE 115-*b*. In some cases, base station 105-*c* may select a cell of the plurality of cells for communication based on the determining whether the number of beams associated with each average cell quality is the same, the calculating the difference between each average cell quality and the highest average cell quality, or the measurement report. For example, base station 105-*c* may select the cell of the plurality of cells based on a default cell selection configuration if the number of beams associated with each average cell quality is the same, if the difference between the highest average cell quality and the average cell quality for the candidate cell is greater than the threshold, if the number of beams associated with the highest average cell quality is greater than the number of beams associated with the average cell quality for the candidate cell, or if the beam quality ratio associated with the highest average cell quality is greater than the beam quality ratio associated with the candidate cell.

In some cases, base station 105-*c* may select the candidate cell as the cell of the plurality of cells if the number of beams associated with the highest average cell quality is less than the number of beams associated with the average cell quality for the candidate cell or if the beam quality ratio associated with the highest average cell quality is less than the beam quality ratio associated with the candidate cell. In some cases, base station 105-*c* may select the cell of the plurality of cells for communication based on a mobility condition of UE 115-*b*. For example, base station 105-*c* may select the cell of the plurality of cells from the first plurality of average cell quality values based on the mobility condition of UE 115-*b*, where the mobility condition of UE 115-*b* includes a non-mobility condition. Additionally or alternatively, base station 105-*b* may select the cell of the plurality of cells from the second plurality of average cell quality values based on the mobility condition of UE 115-*b*, where the mobility condition of UE 115-*b* includes a high mobility condition. In some cases, base station 105-*b* may transmit subsequent configuration signaling indicating an adjustment to the first measurement threshold, the second measurement threshold, or both.

At 645, base station 105-*c* may transmit an indication of the selected cell to UE 115-*b*.

Figure 7:
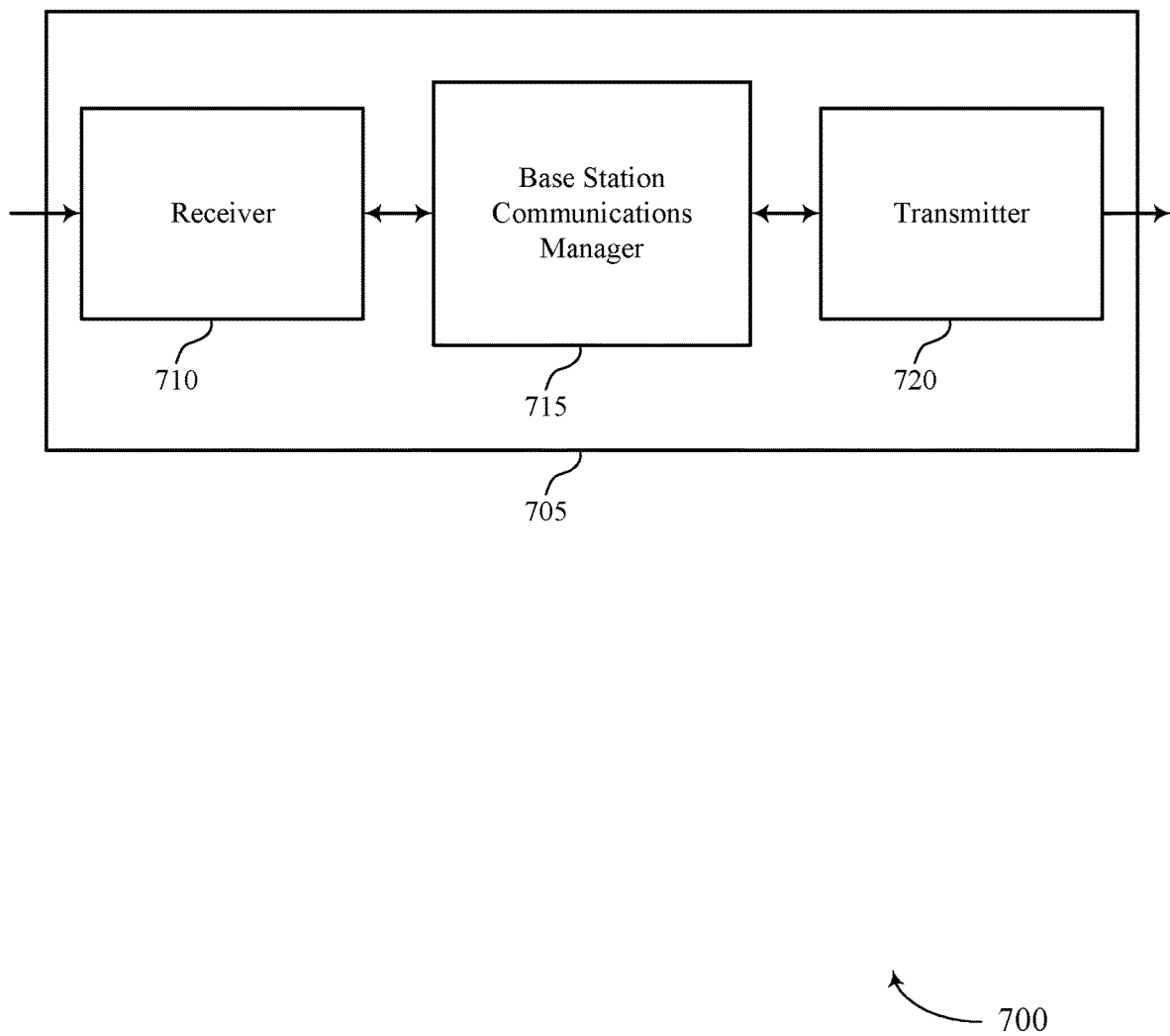
FIGS. 7 through 9 show block diagrams of a device that supports cell quality measurement reporting for cells with mismatched beam numbers in accordance with aspects of the present disclosure.

FIG. 7 shows a block diagram 700 of a wireless device 705 that supports cell quality measurement reporting for cells with mismatched beam numbers in accordance with aspects of the present disclosure. Wireless device 705 may be an example of aspects of a base station 105 as described herein. Wireless device 705 may include receiver 710, base station communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to cell quality measurement reporting for cells with mismatched beam numbers, etc.). Information may be passed on to other components of the device. The receiver 710 may be an example of aspects of the transceiver 1035 described with reference to FIG. 10. The receiver 710 may utilize a single antenna or a set of antennas.

Base station communications manager 715 may be an example of aspects of the base station communications manager 1015 described with reference to FIG. 10.

Base station communications manager 715 and/or at least some of its various sub-components may be implemented in hardware, software executed by a processor, firmware, or any combination thereof. If implemented in software executed by a processor, the functions of the base station communications manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The base station communications manager 715 and/or at least some of its various sub-components may be physically located at various positions, including being distributed such that portions of functions are implemented at different physical locations by one or more physical devices. In some examples, base station communications manager 715 and/or at least some of its various sub-components may be a separate and distinct component in accordance with various aspects of the present disclosure. In other examples, base station communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 715 may receive a measurement report from a UE indicating an average cell quality for each of a set of cells and a number of beams associated with each average cell quality, determine whether the number of beams associated with each average cell quality is the same, and select a cell of the set of cells for communication based on the determining whether the number of beams associated with each average cell quality is the same. The base station communications manager 715 may also receive a measurement report from the UE indicating an average cell quality for each of a set of cells and a beam quality ratio associated with a number of beams for each of the set of cells, where the beam quality ratio indicates a ratio of a maximum beam power and a minimum beam power from the number of beams for each of the set of cells, calculate a difference between each average cell quality and a highest average cell quality from among the average cell qualities, and select a cell of the set of cells for communication based on the calculating the difference between each average cell quality and the highest average cell quality. Additionally, the base station communications manager 715 may transmit configuration signaling indicating a first measurement threshold and a second measurement threshold that is less than the first measurement threshold; receive a measurement report from a UE indicating a first set of average cell quality values and a second set of average cell quality values for each of a set of cells, where the first set of average cell quality values are based on a measurement of a number of beams with a beam quality above the first measurement threshold, and where the second set of average cell quality values are based on a measurement of a number of beams with a beam quality above the second measurement threshold; and select a cell of the set of cells for communication based on the measurement report.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
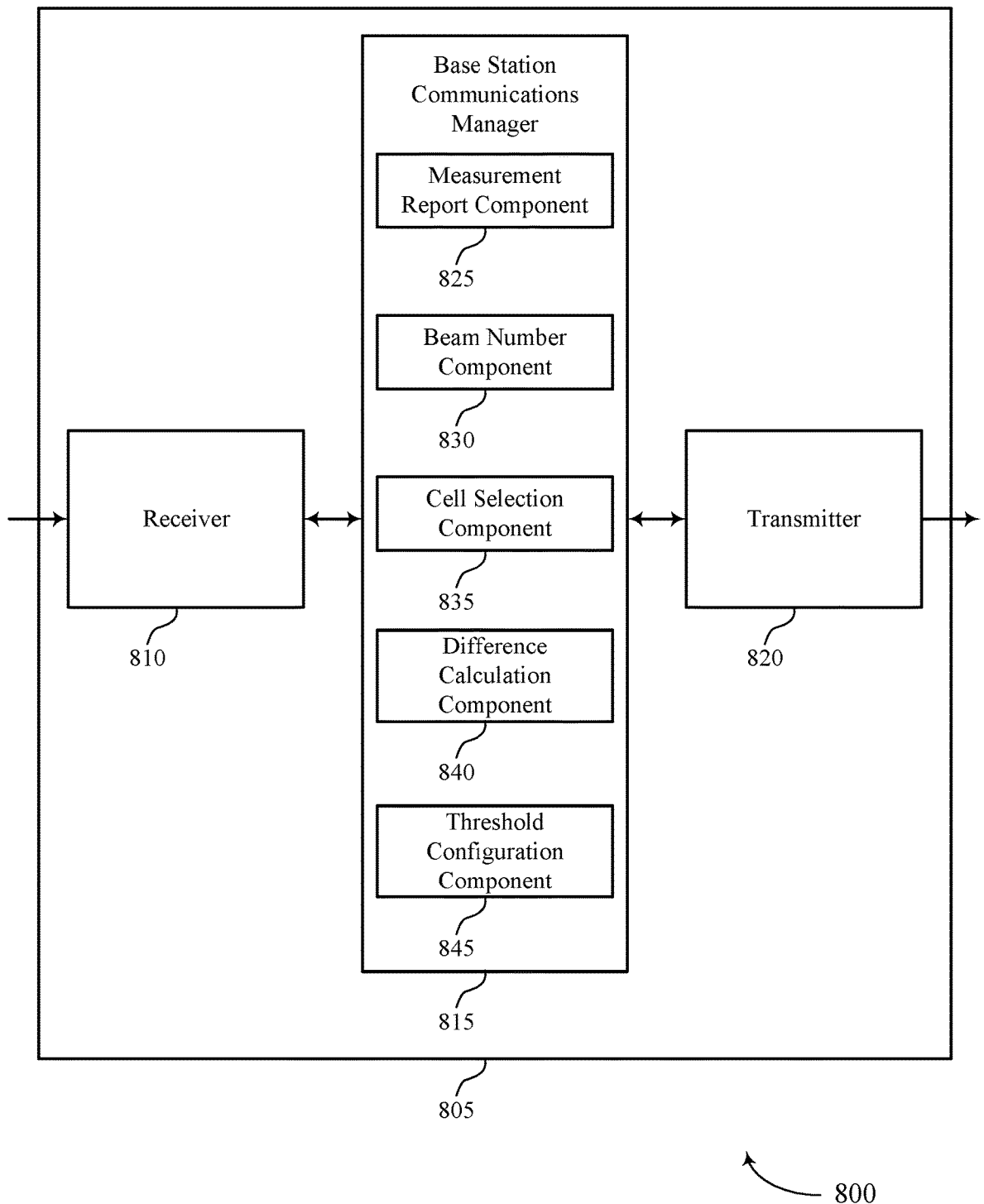

FIG. 8 shows a block diagram 800 of a wireless device 805 that supports cell quality measurement reporting for cells with mismatched beam numbers in accordance with aspects of the present disclosure. Wireless device 805 may be an example of aspects of a wireless device 705 or a base station 105 as described with reference to FIG. 7. Wireless device 805 may include receiver 810, base station communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to cell quality measurement reporting for cells with mismatched beam numbers, etc.). Information may be passed on to other components of the device. The receiver 810 may be an example of aspects of the transceiver 1035 described with reference to FIG. 10. The receiver 810 may utilize a single antenna or a set of antennas.

Base station communications manager 815 may be an example of aspects of the base station communications manager 1015 described with reference to FIG. 10.

Base station communications manager 815 may also include measurement report component 825, beam number component 830, cell selection component 835, difference calculation component 840, and threshold configuration component 845.

Measurement report component 825 may receive a measurement report from a UE indicating an average cell quality for each of a set of cells and a number of beams associated with each average cell quality, receive a measurement report from UE indicating an average cell quality for each of a set of cells and a beam quality ratio associated with a number of beams for each of the set of cells, where the beam quality ratio indicates a ratio of a maximum beam power and a minimum beam power from the number of beams for each of the set of cells, and receive a measurement report from a UE indicating a first set of average cell quality values and a second set of average cell quality values for each of a set of cells, where the first set of average cell quality values are based on a measurement of a number of beams with a beam quality above the first measurement threshold, and where the second set of average cell quality values are based on a measurement of a number of beams with a beam quality above the second measurement threshold. In some cases, the maximum beam power and the minimum beam power include a beam RSRP measurement. In some cases, the beam quality includes a RSRP measurement.

Beam number component 830 may determine whether the number of beams associated with each average cell quality is the same.

Cell selection component 835 may select a cell of the set of cells for communication based on the determining whether the number of beams associated with each average cell quality is the same, select the candidate cell as the cell of the set of cells if the number of beams associated with the highest average cell quality is less than the number of beams associated with the average cell quality for the candidate cell, select a cell of the set of cells for communication based on the calculating the difference between each average cell quality and the highest average cell quality, select the candidate cell as the cell of the set of cells if the beam quality ratio associated with the highest average cell quality is less than the beam quality ratio associated with the candidate cell, and select a cell of the set of cells for communication based on the measurement report.

Difference calculation component 840 may calculate a difference between each average cell quality and a highest average cell quality from among the average cell qualities if the number of beams associated with each average cell quality is not the same, determine whether a difference between the highest average cell quality and a cell quality for a candidate cell of the set of cells is less than a threshold, and calculate a difference between each average cell quality and a highest average cell quality from among the average cell qualities.

Threshold configuration component 845 may transmit configuration signaling indicating a first measurement threshold and a second measurement threshold that is less than the first measurement threshold and transmit subsequent configuration signaling indicating an adjustment to the first measurement threshold, the second measurement threshold, or both.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
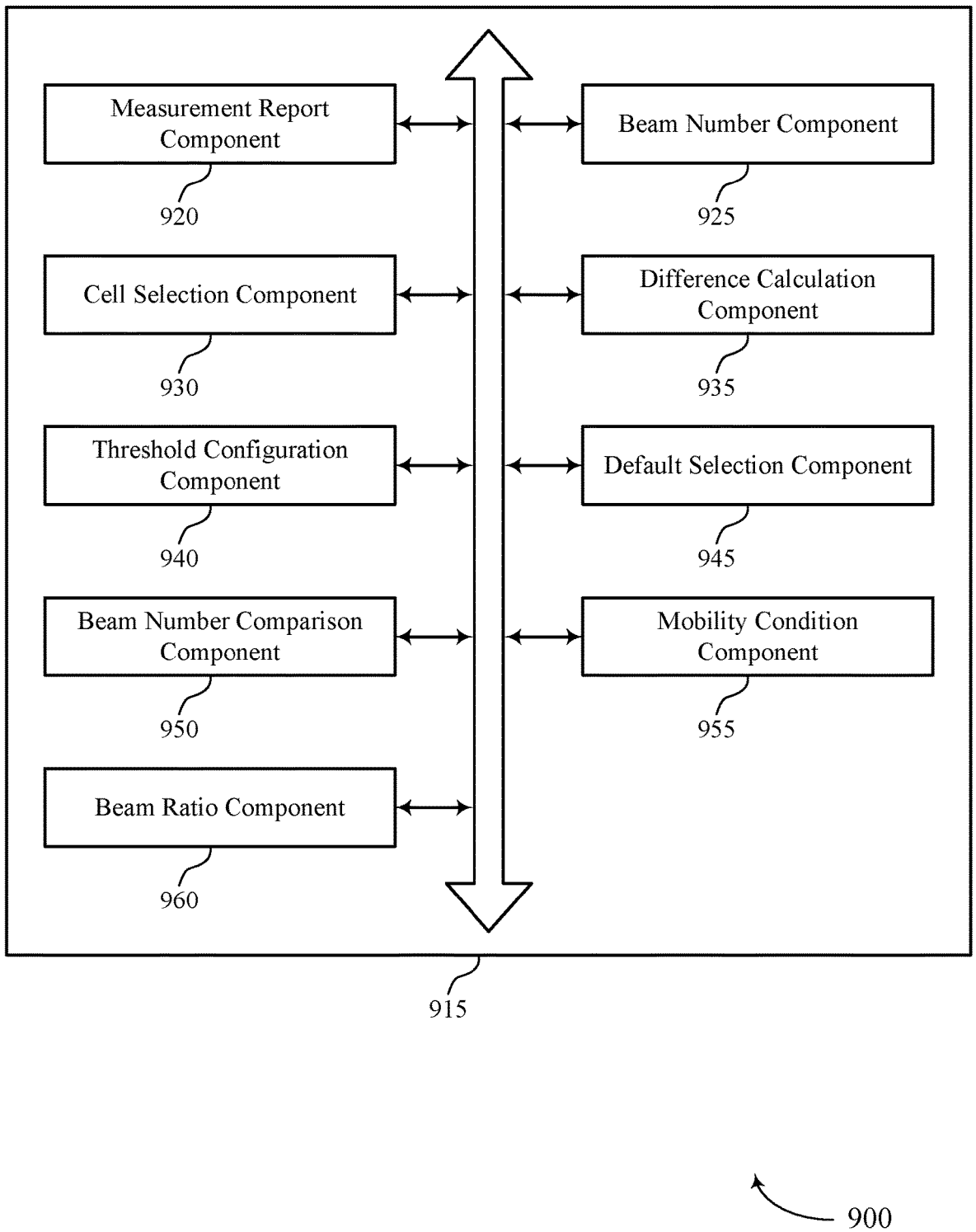

FIG. 9 shows a block diagram 900 of a base station communications manager 915 that supports cell quality measurement reporting for cells with mismatched beam numbers in accordance with aspects of the present disclosure. The base station communications manager 915 may be an example of aspects of a base station communications manager 715, a base station communications manager 815, or a base station communications manager 1015 described with reference to FIGS. 7, 8, and 10. The base station communications manager 915 may include measurement report component 920, beam number component 925, cell selection component 930, difference calculation component 935, threshold configuration component 940, default selection component 945, beam number comparison component 950, mobility condition component 955, and beam ratio component 960. Each of these modules may communicate, directly or indirectly, with one another (e.g., via one or more buses).

Measurement report component 920 may receive a measurement report from a UE indicating an average cell quality for each of a set of cells and a number of beams associated with each average cell quality, receive a measurement report from UE indicating an average cell quality for each of a set of cells and a beam quality ratio associated with a number of beams for each of the set of cells, where the beam quality ratio indicates a ratio of a maximum beam power and a minimum beam power from the number of beams for each of the set of cells, and receive a measurement report from a UE indicating a first set of average cell quality values and a second set of average cell quality values for each of a set of cells, where the first set of average cell quality values are based on a measurement of a number of beams with a beam quality above the first measurement threshold, and where the second set of average cell quality values are based on a measurement of a number of beams with a beam quality above the second measurement threshold. In some cases, the maximum beam power and the minimum beam power include a beam RSRP measurement. In some cases, the beam quality includes a RSRP measurement.

Beam number component 925 may determine whether the number of beams associated with each average cell quality is the same.

Cell selection component 930 may select a cell of the set of cells for communication based on the determining whether the number of beams associated with each average cell quality is the same, select the candidate cell as the cell of the set of cells if the number of beams associated with the highest average cell quality is less than the number of beams associated with the average cell quality for the candidate cell, select a cell of the set of cells for communication based on the calculating the difference between each average cell quality and the highest average cell quality, select the candidate cell as the cell of the set of cells if the beam quality ratio associated with the highest average cell quality is less than the beam quality ratio associated with the candidate cell, and select a cell of the set of cells for communication based on the measurement report.

Difference calculation component 935 may calculate a difference between each average cell quality and a highest average cell quality from among the average cell qualities if the number of beams associated with each average cell quality is not the same, determine whether a difference between the highest average cell quality and a cell quality for a candidate cell of the set of cells is less than a threshold, and calculate a difference between each average cell quality and a highest average cell quality from among the average cell qualities.

Threshold configuration component 940 may transmit configuration signaling indicating a first measurement threshold and a second measurement threshold that is less than the first measurement threshold and transmit subsequent configuration signaling indicating an adjustment to the first measurement threshold, the second measurement threshold, or both.

Default selection component 945 may select the cell of the set of cells based on a default cell selection configuration if the number of beams associated with each average cell quality is the same, select the cell of the set of cells based on a default cell selection configuration if the difference between the highest average cell quality and the average cell quality for the candidate cell is greater than the threshold, select the cell of the set of cells based on a default cell selection configuration if the number of beams associated with the highest average cell quality is greater than the number of beams associated with the average cell quality for the candidate cell, and select the cell of the set of cells based on a default cell selection configuration if the beam quality ratio associated with the highest average cell quality is greater than the beam quality ratio associated with the candidate cell.

Beam number comparison component 950 may determine whether the number of beams associated with the highest average cell quality is less than the number of beams associated with the average cell quality for the candidate cell if the difference between the highest average cell quality and the average cell quality for the candidate cell is less than the threshold.

Mobility condition component 955 may select the cell of the set of cells for communication based on a mobility condition of the UE, select the cell of the set of cells from the first set of average cell quality values based on the mobility condition of the UE, where the mobility condition of the UE includes a non-mobility condition, and select the cell of the set of cells from the second set of average cell quality values based on the mobility condition of the UE, where the mobility condition of the UE includes a high mobility condition.

Beam ratio component 960 may determine whether the beam quality ratio associated with the highest average cell quality is less than the beam quality ratio associated with the candidate cell.

Figure 10:
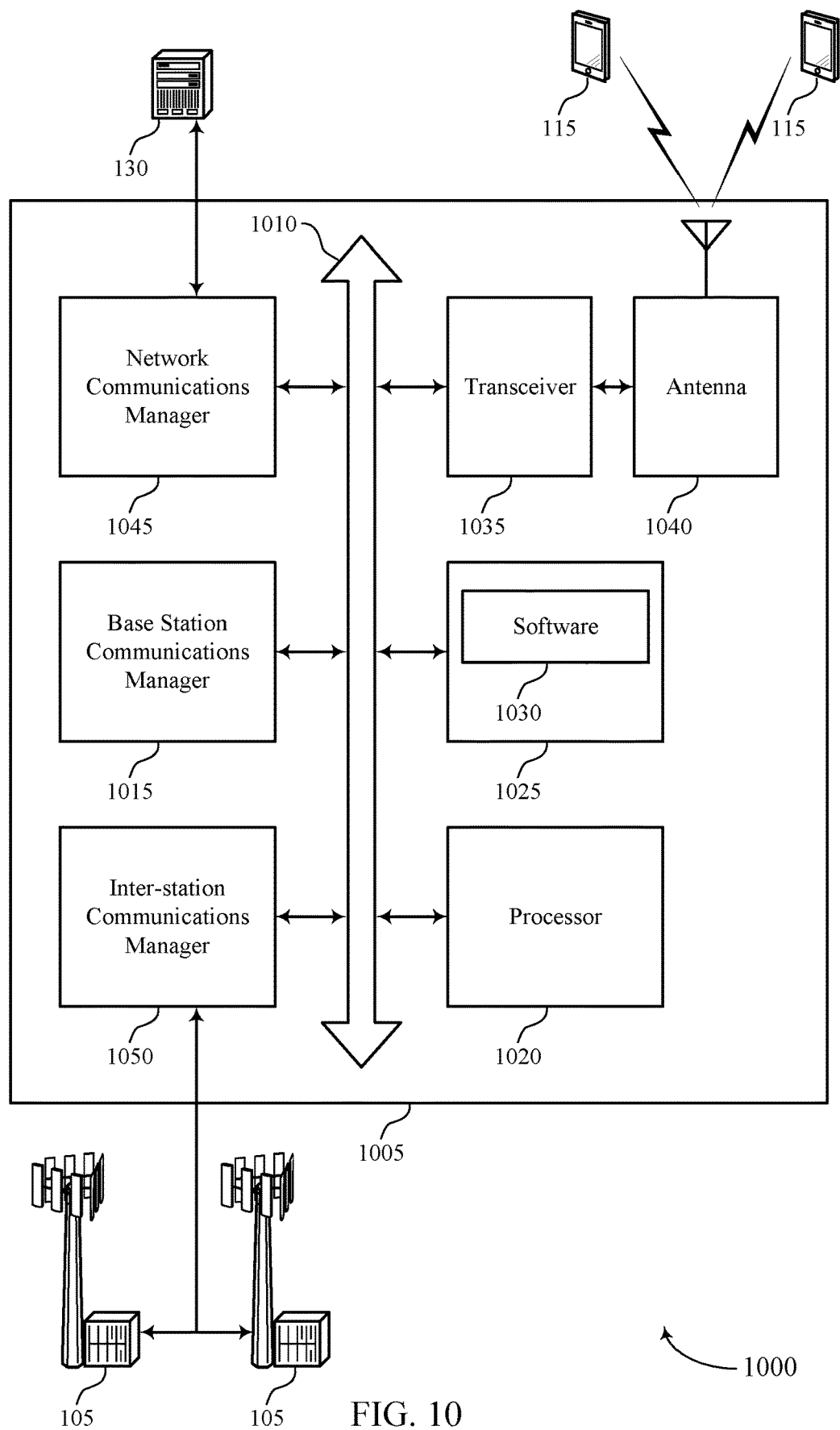
FIG. 10 illustrates a block diagram of a system including a base station that supports cell quality measurement reporting for cells with mismatched beam numbers in accordance with aspects of the present disclosure.

FIG. 10 shows a diagram of a system 1000 including a device 1005 that supports cell quality measurement reporting for cells with mismatched beam numbers in accordance with aspects of the present disclosure. Device 1005 may be an example of or include the components of wireless device 705, wireless device 805, or a base station 105 as described herein, e.g., with reference to FIGS. 7 and 8. Device 1005 may include components for bi-directional voice and data communications including components for transmitting and receiving communications, including base station communications manager 1015, processor 1020, memory 1025, software 1030, transceiver 1035, antenna 1040, network communications manager 1045, and inter-station communications manager 1050. These components may be in electronic communication via one or more buses (e.g., bus 1010). Device 1005 may communicate wirelessly with one or more UEs 115.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting cell quality measurement reporting for cells with mismatched beam numbers).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support cell quality measurement reporting for cells with mismatched beam numbers. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described herein. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

Network communications manager 1045 may manage communications with the core network (e.g., via one or more wired backhaul links). For example, the network communications manager 1045 may manage the transfer of data communications for client devices, such as one or more UEs 115.

Inter-station communications manager 1050 may manage communications with other base station 105, and may include a controller or scheduler for controlling communications with UEs 115 in cooperation with other base stations 105. For example, the inter-station communications manager 1050 may coordinate scheduling for transmissions to UEs 115 for various interference mitigation techniques such as beamforming or joint transmission. In some examples, inter-station communications manager 1050 may provide an X2 interface within an Long Term Evolution (LTE)/LTE-A wireless communication network technology to provide communication between base stations 105.

Figure 11:
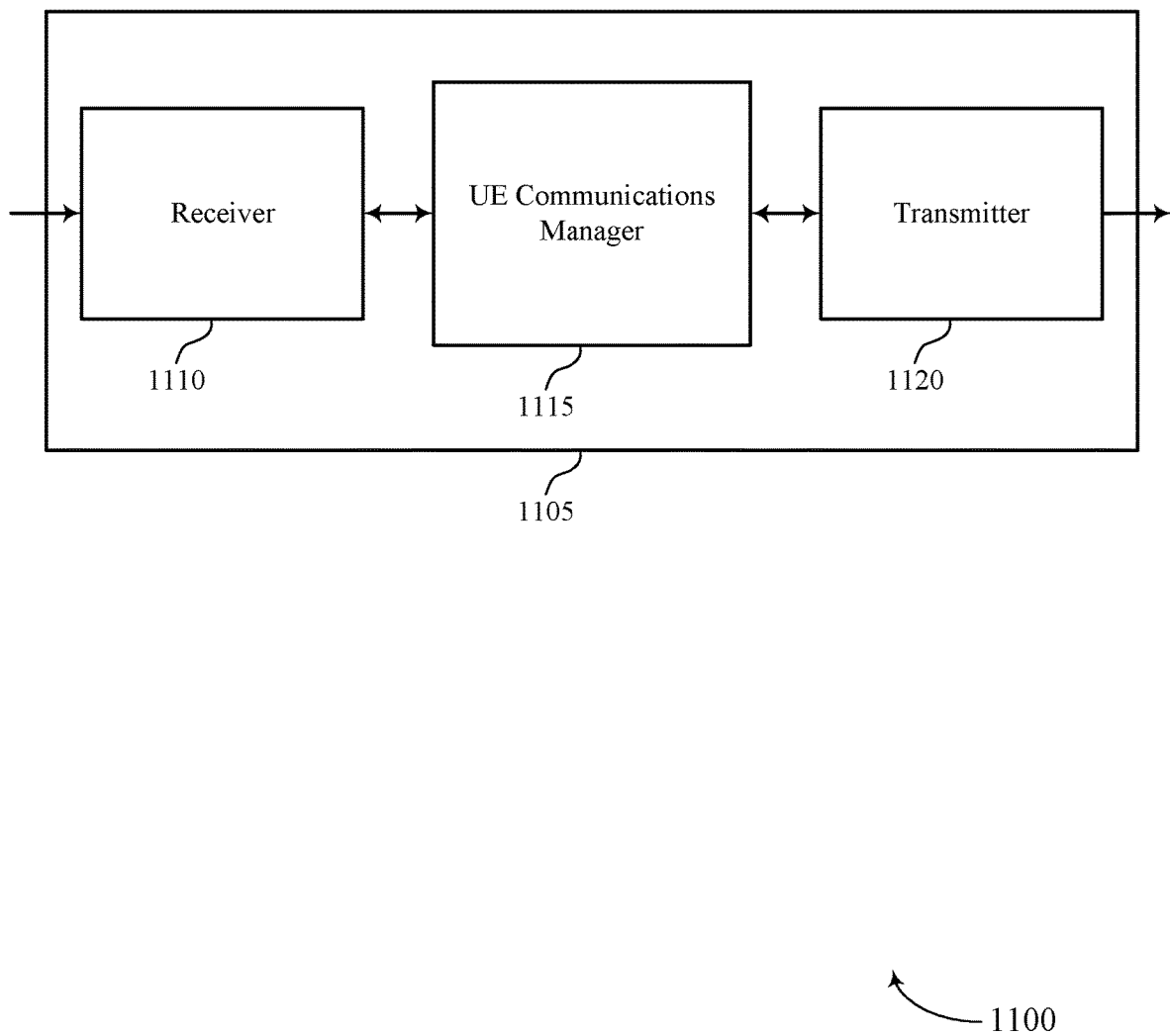
FIGS. 11 through 13 show block diagrams of a device that supports cell quality measurement reporting for cells with mismatched beam numbers in accordance with aspects of the present disclosure.

FIG. 11 shows a block diagram 1100 of a wireless device 1105 that supports cell quality measurement reporting for cells with mismatched beam numbers in accordance with aspects of the present disclosure. Wireless device 1105 may be an example of aspects of a UE 115 as described herein. Wireless device 1105 may include receiver 1110, UE communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to cell quality measurement reporting for cells with mismatched beam numbers, etc.). Information may be passed on to other components of the device. The receiver 1110 may be an example of aspects of the transceiver 1435 described with reference to FIG. 14. The receiver 1110 may utilize a single antenna or a set of antennas.

UE communications manager 1115 may be an example of aspects of the UE communications manager 1415 described with reference to FIG. 14.

UE communications manager 1115 and/or at least some of its various sub-components may be implemented in hardware, software executed by a processor, firmware, or any combination thereof. If implemented in software executed by a processor, the functions of the UE communications manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE communications manager 1115 and/or at least some of its various sub-components may be physically located at various positions, including being distributed such that portions of functions are implemented at different physical locations by one or more physical devices. In some examples, UE communications manager 1115 and/or at least some of its various sub-components may be a separate and distinct component in accordance with various aspects of the present disclosure. In other examples, UE communications manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 1115 may measure a quality of a number of beams for each of a set of cells, determine an average cell quality for each of the set of cells based on the measurement of the number of beams for each of the set of cells, and transmit a measurement report indicating the average cell quality for each of the set of cells and the number of beams associated with each average cell quality. The UE communications manager 1115 may also measure a quality of a number of beams for each of a set of cells, determine an average cell quality and a beam quality ratio for each of the set of cells based on the measurement of the number of beams for each of the set of cells, where the beam quality ratio indicates a ratio of a maximum beam quality and a minimum beam quality from the number of beams for each of the set of cells, and transmit a measurement report indicating the average cell quality for each of the set of cells and the beam quality ratio associated with each average cell quality. The UE communications manager 1115 may also receive configuration signaling indicating a first measurement threshold and a second measurement threshold that is less than the first measurement threshold, determine a first average cell quality for each of a set of cells based on a measurement of a number of beams for each of the set of cells with a beam quality above the first measurement threshold, determine a second average cell quality for each of the set of cells based on a measurement of a number of beams for each of the set of cells with a beam quality above the second measurement threshold, and transmit a measurement report indicating a first set of average cell quality values and a second set of average cell quality values for each of the set of cells, where the first set of average cell quality values includes the first average cell quality for each of the set of cells, and where the second set of average cell quality values includes the second average cell quality for each of the set of cells. The UE communications manager 1115 may also measure a quality of a number of beams for each of a set of cells, determine an average cell quality for each of the set of cells based on the measurement of the number of beams for each of the set of cells, determine a beam quality ratio for each of the set of cells based on the measurement of the number of beams for each of the set of cells, where the beam quality ratio indicates a ratio of a maximum beam power and a minimum beam power from the number of beams for each of the set of cells, determine a cell quality offset value for each of the set of cells based on the average cell quality for each of the set of cells, the beam quality ratio for each of the set of cells, or both, and transmit a measurement report indicating a combination of the average cell quality and the cell quality offset value for each of the set of cells.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Figure 12:
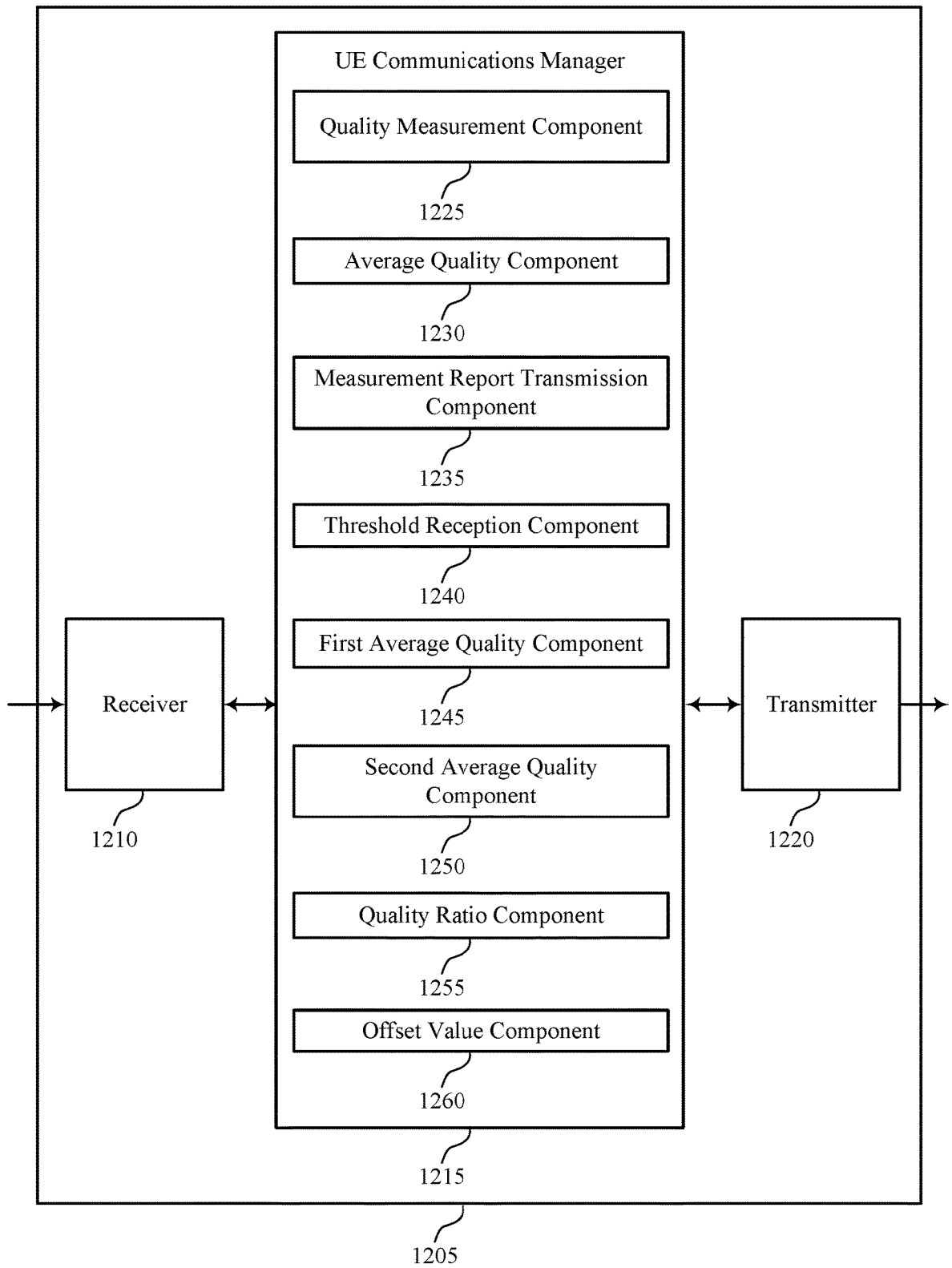

FIG. 12 shows a block diagram 1200 of a wireless device 1205 that supports cell quality measurement reporting for cells with mismatched beam numbers in accordance with aspects of the present disclosure. Wireless device 1205 may be an example of aspects of a wireless device 1105 or a UE 115 as described with reference to FIG. 11. Wireless device 1205 may include receiver 1210, UE communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to cell quality measurement reporting for cells with mismatched beam numbers, etc.). Information may be passed on to other components of the device. The receiver 1210 may be an example of aspects of the transceiver 1435 described with reference to FIG. 14. The receiver 1210 may utilize a single antenna or a set of antennas.

UE communications manager 1215 may be an example of aspects of the UE communications manager 1415 described with reference to FIG. 14.

UE communications manager 1215 may also include quality measurement component 1225, average quality component 1230, measurement report transmission component 1235, threshold reception component 1240, first average quality component 1245, second average quality component 1250, quality ratio component 1255, and offset value component 1260.

Quality measurement component 1225 may measure a quality of a number of beams for each of a set of cells.

Average quality component 1230 may determine an average cell quality for each of the set of cells based on the measurement of the number of beams for each of the set of cells and determine an average cell quality and a beam quality ratio for each of the set of cells based on the measurement of the number of beams for each of the set of cells, where the beam quality ratio indicates a ratio of a maximum beam quality and a minimum beam quality from the number of beams for each of the set of cells.

Measurement report transmission component 1235 may transmit a measurement report indicating the average cell quality for each of the set of cells and the number of beams associated with each average cell quality, transmit a measurement report indicating the average cell quality for each of the set of cells and the beam quality ratio associated with each average cell quality, transmit a measurement report indicating a first set of average cell quality values and a second set of average cell quality values for each of the set of cells, where the first set of average cell quality values includes the first average cell quality for each of the set of cells, and where the second set of average cell quality values includes the second average cell quality for each of the set of cells, and transmit a measurement report indicating a combination of the average cell quality and the cell quality offset value for each of the set of cells.

Threshold reception component 1240 may receive configuration signaling indicating a first measurement threshold and a second measurement threshold that is less than the first measurement threshold.

First average quality component 1245 may determine a first average cell quality for each of a set of cells based on a measurement of a number of beams for each of the set of cells with a beam quality above the first measurement threshold.

Second average quality component 1250 may determine a second average cell quality for each of the set of cells based on a measurement of a number of beams for each of the set of cells with a beam quality above the second measurement threshold.

Quality ratio component 1255 may determine a beam quality ratio for each of the set of cells based on the measurement of the number of beams for each of the set of cells, where the beam quality ratio indicates a ratio of a maximum beam power and a minimum beam power from the number of beams for each of the set of cells.

Offset value component 1260 may determine a cell quality offset value for each of the set of cells based on the average cell quality for each of the set of cells, the beam quality ratio for each of the set of cells, or both and determine the cell quality offset value for each of the set of cells based on a mobility condition of the UE.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
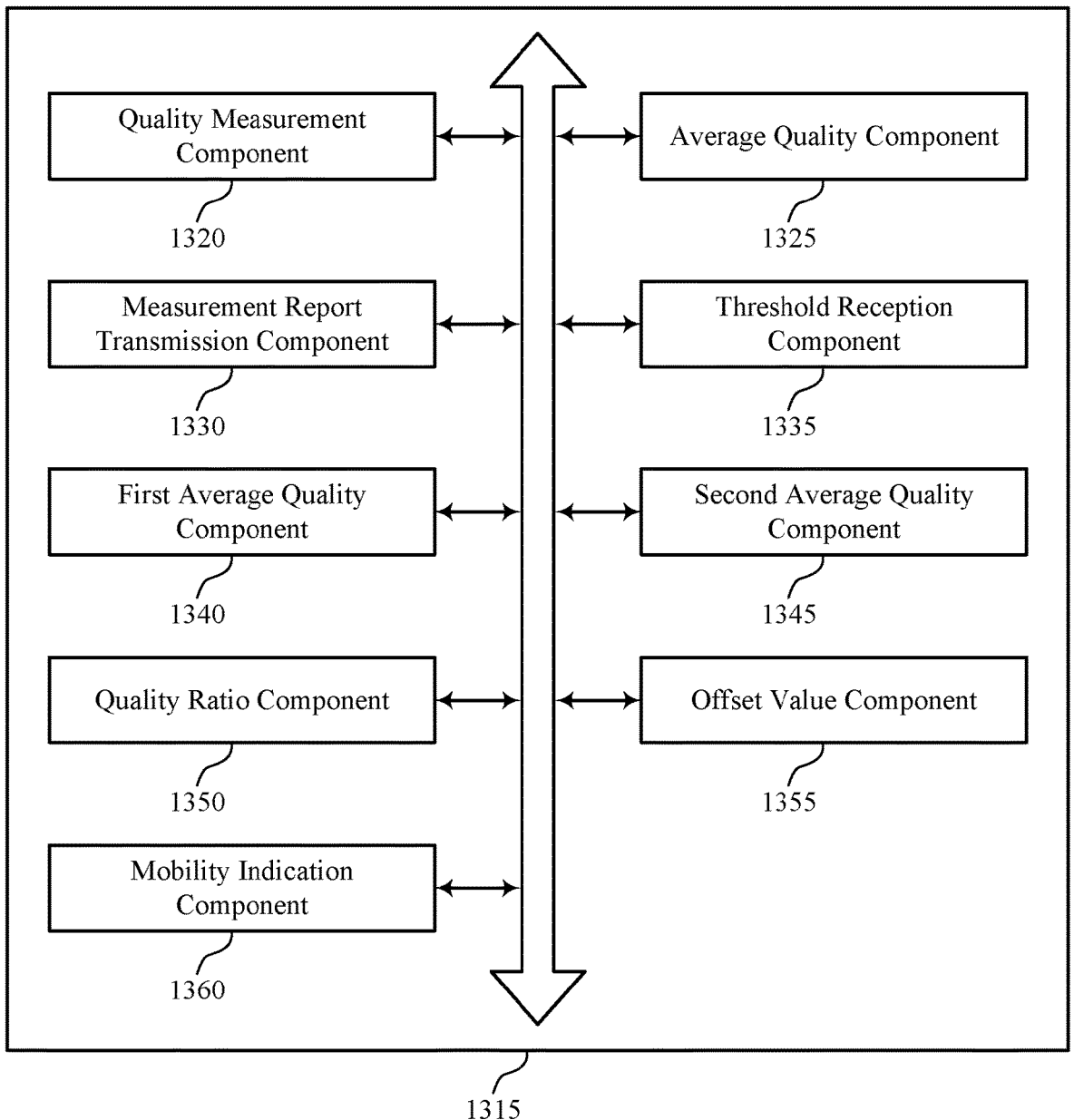

FIG. 13 shows a block diagram 1300 of a UE communications manager 1315 that supports cell quality measurement reporting for cells with mismatched beam numbers in accordance with aspects of the present disclosure. The UE communications manager 1315 may be an example of aspects of a UE communications manager 1415 described with reference to FIGS. 11, 12, and 14. The UE communications manager 1315 may include quality measurement component 1320, average quality component 1325, measurement report transmission component 1330, threshold reception component 1335, first average quality component 1340, second average quality component 1345, quality ratio component 1350, offset value component 1355, and mobility indication component 1360. Each of these modules may communicate, directly or indirectly, with one another (e.g., via one or more buses).

Quality measurement component 1320 may measure a quality of a number of beams for each of a set of cells.

Average quality component 1325 may determine an average cell quality for each of the set of cells based on the measurement of the number of beams for each of the set of cells and determine an average cell quality and a beam quality ratio for each of the set of cells based on the measurement of the number of beams for each of the set of cells, where the beam quality ratio indicates a ratio of a maximum beam quality and a minimum beam quality from the number of beams for each of the set of cells.

Measurement report transmission component 1330 may transmit a measurement report indicating the average cell quality for each of the set of cells and the number of beams associated with each average cell quality, transmit a measurement report indicating the average cell quality for each of the set of cells and the beam quality ratio associated with each average cell quality, transmit a measurement report indicating a first set of average cell quality values and a second set of average cell quality values for each of the set of cells, where the first set of average cell quality values includes the first average cell quality for each of the set of cells, and where the second set of average cell quality values includes the second average cell quality for each of the set of cells, and transmit a measurement report indicating a combination of the average cell quality and the cell quality offset value for each of the set of cells.

Threshold reception component 1335 may receive configuration signaling indicating a first measurement threshold and a second measurement threshold that is less than the first measurement threshold.

First average quality component 1340 may determine a first average cell quality for each of a set of cells based on a measurement of a number of beams for each of the set of cells with a beam quality above the first measurement threshold.

Second average quality component 1345 may determine a second average cell quality for each of the set of cells based on a measurement of a number of beams for each of the set of cells with a beam quality above the second measurement threshold.

Quality ratio component 1350 may determine a beam quality ratio for each of the set of cells based on the measurement of the number of beams for each of the set of cells, where the beam quality ratio indicates a ratio of a maximum beam power and a minimum beam power from the number of beams for each of the set of cells.

Offset value component 1355 may determine a cell quality offset value for each of the set of cells based on the average cell quality for each of the set of cells, the beam quality ratio for each of the set of cells, or both and determine the cell quality offset value for each of the set of cells based on a mobility condition of the UE.

Mobility indication component 1360 may transmit an indication of a mobility condition of the UE.

Figure 14:
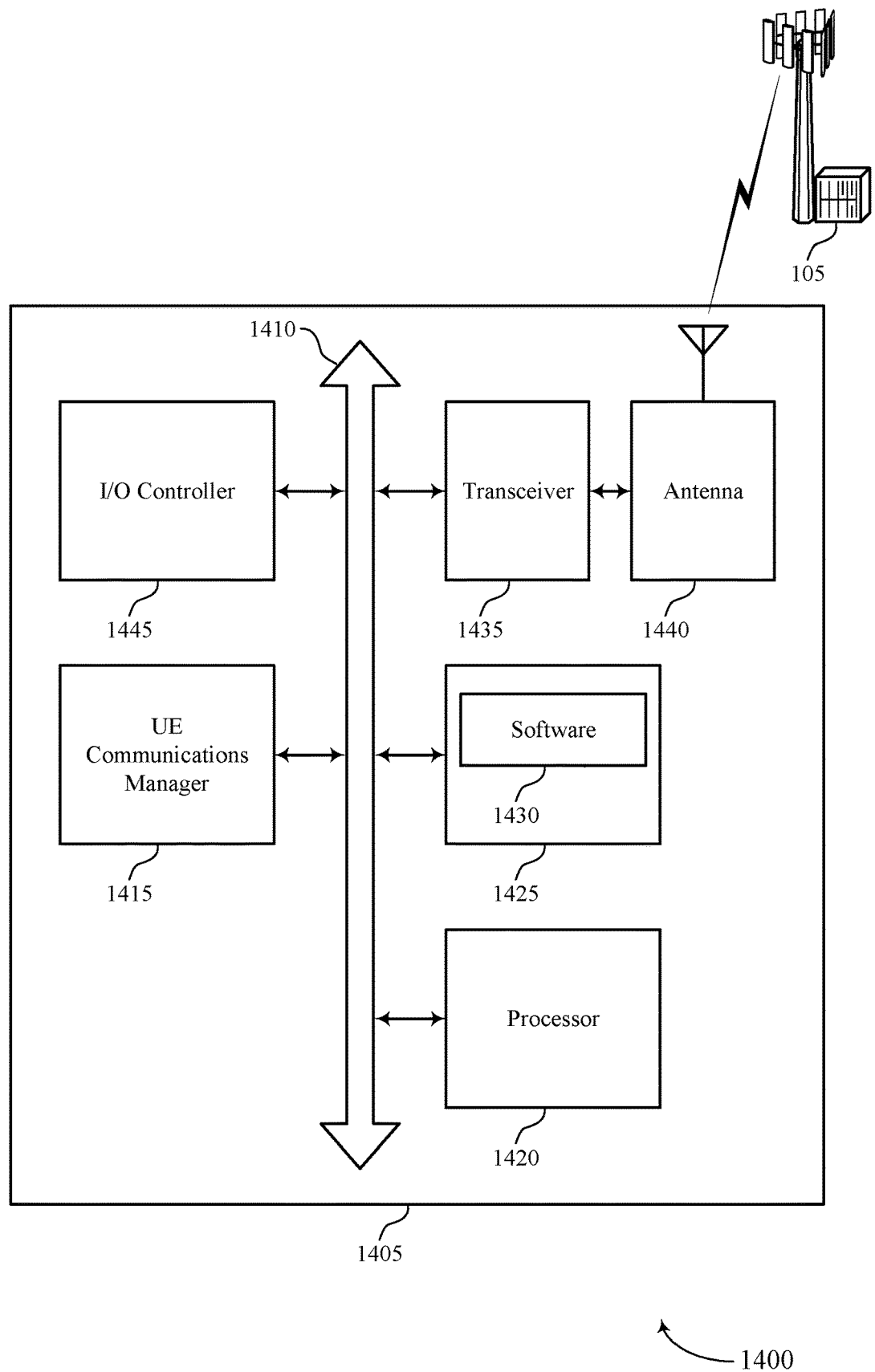
FIG. 14 illustrates a block diagram of a system including a UE that supports cell quality measurement reporting for cells with mismatched beam numbers in accordance with aspects of the present disclosure.

FIG. 14 shows a diagram of a system 1400 including a device 1405 that supports cell quality measurement reporting for cells with mismatched beam numbers in accordance with aspects of the present disclosure. Device 1405 may be an example of or include the components of UE 115 as described herein, e.g., with reference to FIG. 1. Device 1405 may include components for bi-directional voice and data communications including components for transmitting and receiving communications, including UE communications manager 1415, processor 1420, memory 1425, software 1430, transceiver 1435, antenna 1440, and I/O controller 1445. These components may be in electronic communication via one or more buses (e.g., bus 1410). Device 1405 may communicate wirelessly with one or more base stations 105.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting cell quality measurement reporting for cells with mismatched beam numbers).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware or software operation such as the interaction with peripheral components or devices.

Software 1430 may include code to implement aspects of the present disclosure, including code to support cell quality measurement reporting for cells with mismatched beam numbers. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described herein. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

I/O controller 1445 may manage input and output signals for device 1405. I/O controller 1445 may also manage peripherals not integrated into device 1405. In some cases, I/O controller 1445 may represent a physical connection or port to an external peripheral. In some cases, I/O controller 1445 may utilize an operating system such as iOS®, ANDROID®, MS-DOS®, MS-WINDOWS®, OS/2®, UNIX®, LINUX®, or another known operating system. In other cases, I/O controller 1445 may represent or interact with a modem, a keyboard, a mouse, a touchscreen, or a similar device. In some cases, I/O controller 1445 may be implemented as part of a processor. In some cases, a user may interact with device 1405 via I/O controller 1445 or via hardware components controlled by I/O controller 1445.

Figure 15:
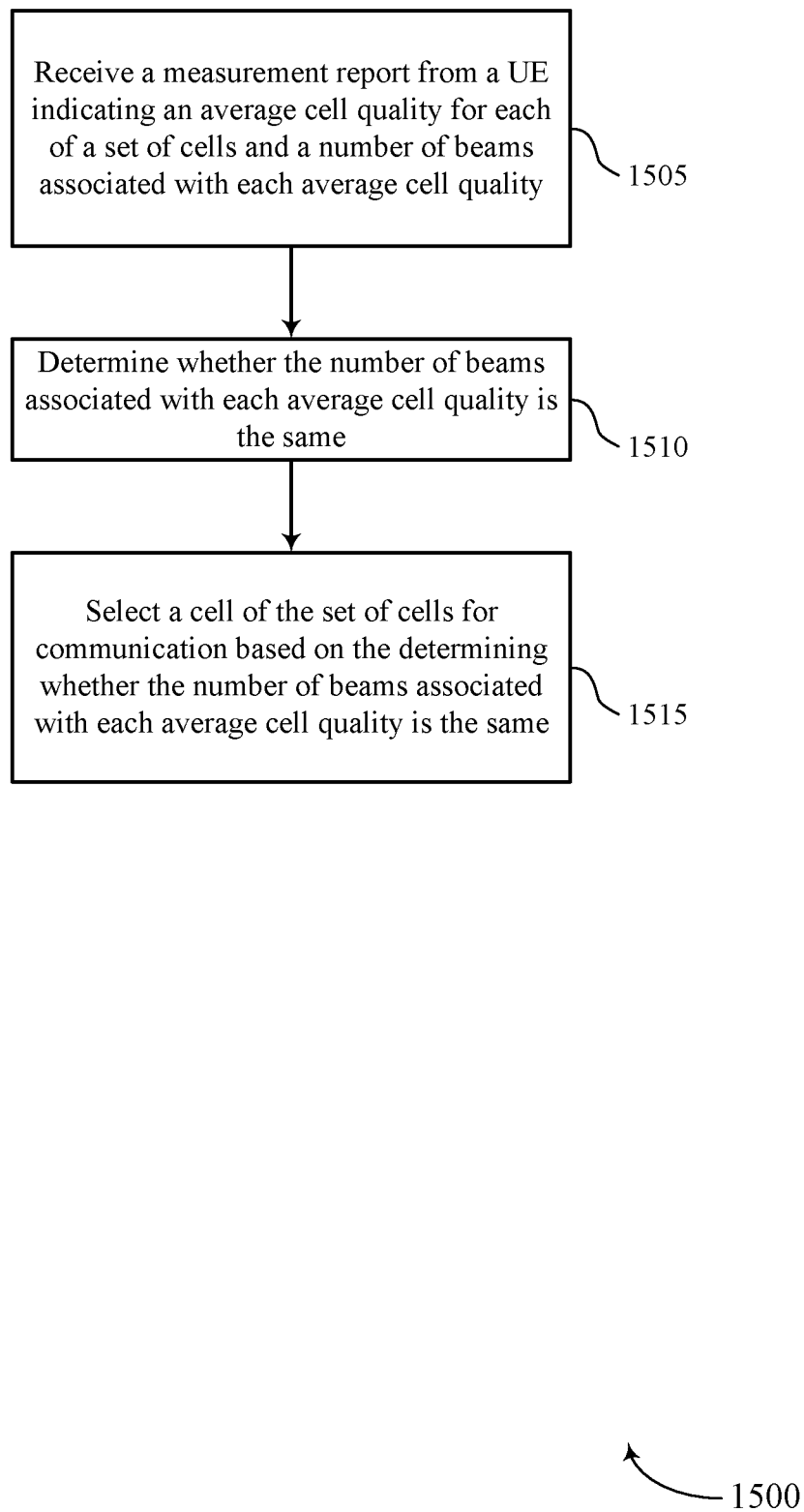
FIGS. 15 through 21 illustrate methods for cell quality measurement reporting for cells with mismatched beam numbers in accordance with aspects of the present disclosure.

FIG. 15 shows a flowchart illustrating a method 1500 for cell quality measurement reporting for cells with mismatched beam numbers in accordance with aspects of the present disclosure. The operations of method 1500 may be implemented by a base station 105 or its components as described herein. For example, the operations of method 1500 may be performed by a base station communications manager as described with reference to FIGS. 7 through 10. In some examples, a base station 105 may execute a set of codes to control the functional elements of the device to perform the functions described herein. Additionally or alternatively, the base station 105 may perform aspects of the functions described herein using special-purpose hardware.

At 1505 the base station 105 may receive a measurement report from a UE indicating an average cell quality for each of a plurality of cells and a number of beams associated with each average cell quality. The operations of 1505 may be performed according to the methods described herein. In certain examples, aspects of the operations of 1505 may be performed by a measurement report component as described with reference to FIGS. 7 through 10.

At 1510 the base station 105 may determine whether the number of beams associated with each average cell quality is the same. The operations of 1510 may be performed according to the methods described herein. In certain examples, aspects of the operations of 1510 may be performed by a beam number component as described with reference to FIGS. 7 through 10.

At 1515 the base station 105 may select a cell of the plurality of cells for communication based on the determining whether the number of beams associated with each average cell quality is the same. The operations of 1515 may be performed according to the methods described herein. In certain examples, aspects of the operations of 1515 may be performed by a cell selection component as described with reference to FIGS. 7 through 10.

Figure 16:
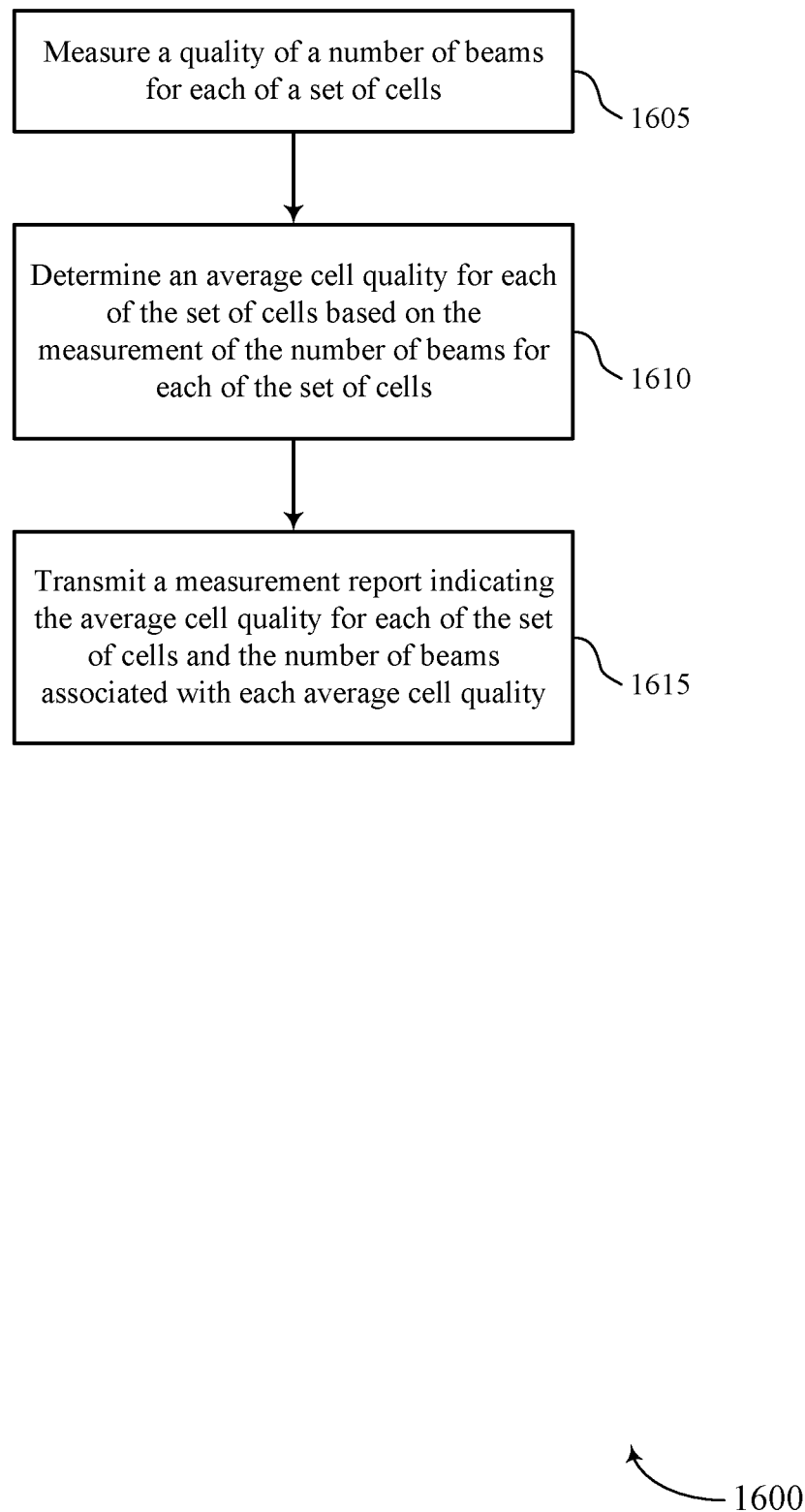

FIG. 16 shows a flowchart illustrating a method 1600 for cell quality measurement reporting for cells with mismatched beam numbers in accordance with aspects of the present disclosure. The operations of method 1600 may be implemented by a UE 115 or its components as described herein. For example, the operations of method 1600 may be performed by a UE communications manager as described with reference to FIGS. 11 through 14. In some examples, a UE 115 may execute a set of codes to control the functional elements of the device to perform the functions described herein. Additionally or alternatively, the UE 115 may perform aspects of the functions described herein using special-purpose hardware.

At 1605 the UE 115 may measure a quality of a number of beams for each of a plurality of cells. The operations of 1605 may be performed according to the methods described herein. In certain examples, aspects of the operations of 1605 may be performed by a quality measurement component as described with reference to FIGS. 11 through 14.

At 1610 the UE 115 may determine an average cell quality for each of the plurality of cells based on the measurement of the number of beams for each of the plurality of cells. The operations of 1610 may be performed according to the methods described herein. In certain examples, aspects of the operations of 1610 may be performed by an average quality component as described with reference to FIGS. 11 through 14.

At 1615 the UE 115 may transmit a measurement report indicating the average cell quality for each of the plurality of cells and the number of beams associated with each average cell quality. The operations of 1615 may be performed according to the methods described herein. In certain examples, aspects of the operations of 1615 may be performed by a measurement report transmission component as described with reference to FIGS. 11 through 14.

Figure 17:
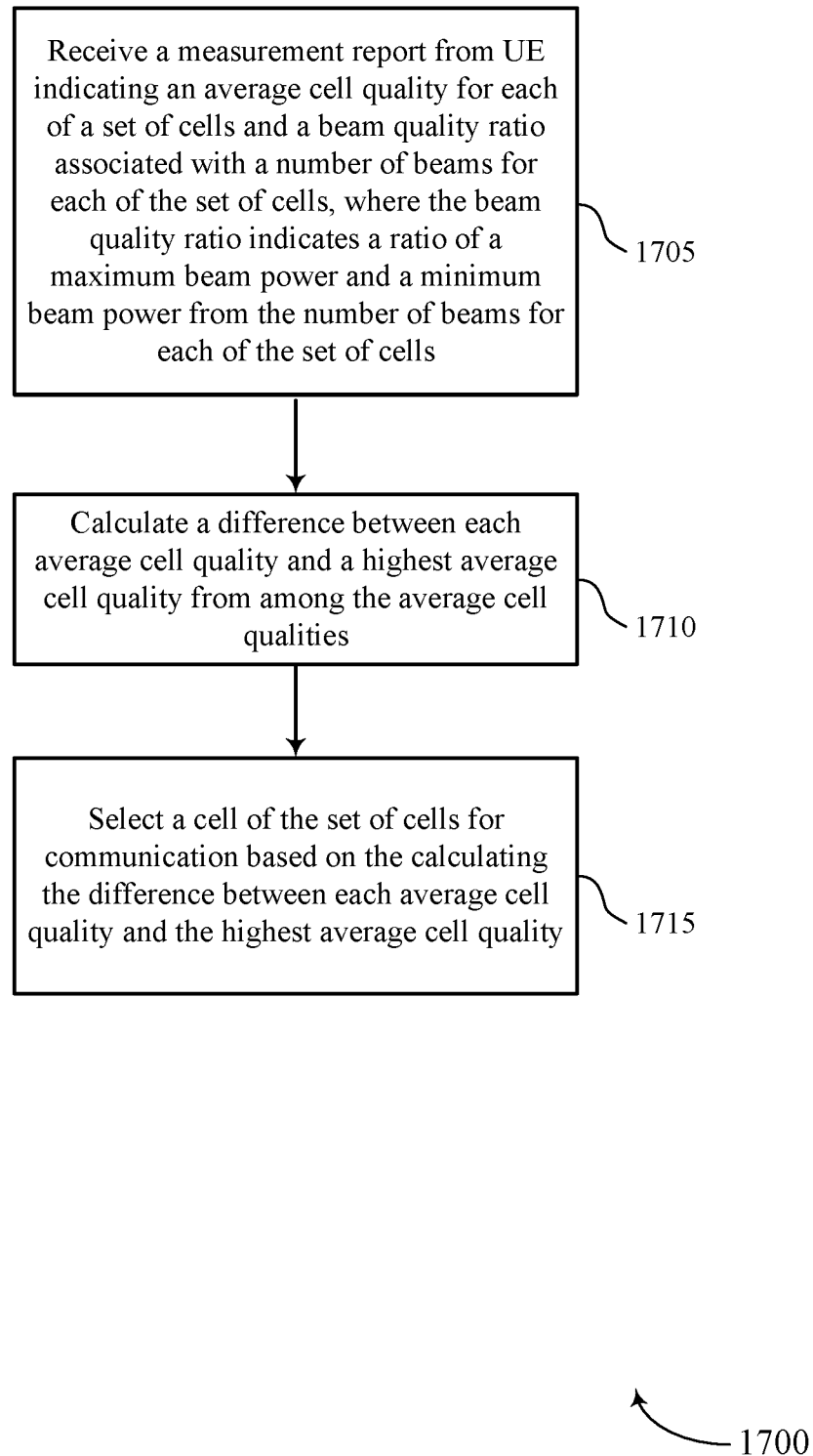

FIG. 17 shows a flowchart illustrating a method 1700 for cell quality measurement reporting for cells with mismatched beam numbers in accordance with aspects of the present disclosure. The operations of method 1700 may be implemented by a base station 105 or its components as described herein. For example, the operations of method 1700 may be performed by a base station communications manager as described with reference to FIGS. 7 through 10. In some examples, a base station 105 may execute a set of codes to control the functional elements of the device to perform the functions described herein. Additionally or alternatively, the base station 105 may perform aspects of the functions described herein using special-purpose hardware.

At 1705 the base station 105 may receive a measurement report from UE indicating an average cell quality for each of a plurality of cells and a beam quality ratio associated with a number of beams for each of the plurality of cells, where the beam quality ratio indicates a ratio of a maximum beam power and a minimum beam power from the number of beams for each of the plurality of cells. The operations of 1705 may be performed according to the methods described herein. In certain examples, aspects of the operations of 1705 may be performed by a measurement report component as described with reference to FIGS. 7 through 10.

At 1710 the base station 105 may calculate a difference between each average cell quality and a highest average cell quality from among the average cell qualities. The operations of 1710 may be performed according to the methods described herein. In certain examples, aspects of the operations of 1710 may be performed by a difference calculation component as described with reference to FIGS. 7 through 10.

At 1715 the base station 105 may select a cell of the plurality of cells for communication based on the calculating the difference between each average cell quality and the highest average cell quality. The operations of 1715 may be performed according to the methods described herein. In certain examples, aspects of the operations of 1715 may be performed by a cell selection component as described with reference to FIGS. 7 through 10.

Figure 18:
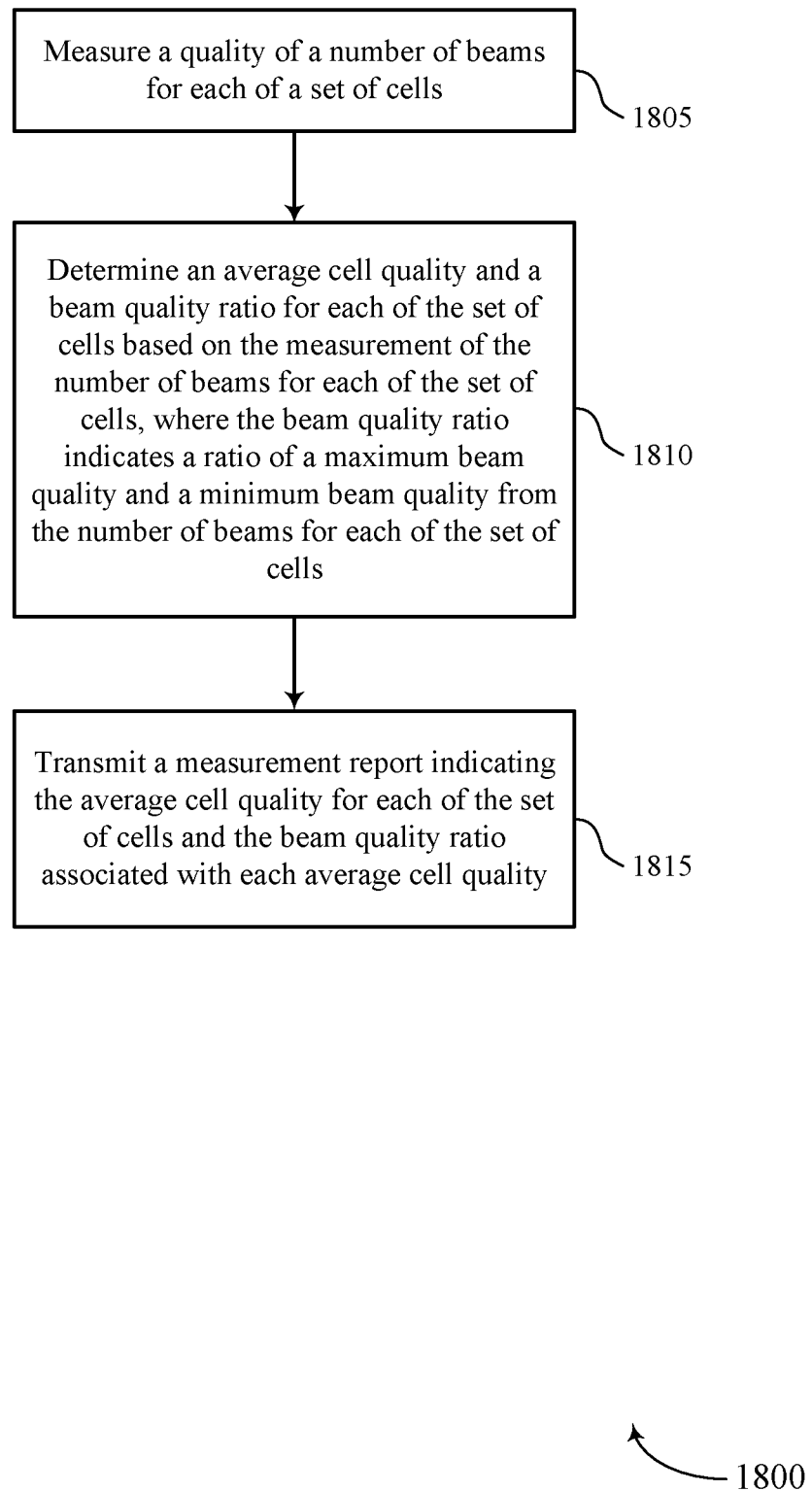

FIG. 18 shows a flowchart illustrating a method 1800 for cell quality measurement reporting for cells with mismatched beam numbers in accordance with aspects of the present disclosure. The operations of method 1800 may be implemented by a UE 115 or its components as described herein. For example, the operations of method 1800 may be performed by a UE communications manager as described with reference to FIGS. 11 through 14. In some examples, a UE 115 may execute a set of codes to control the functional elements of the device to perform the functions described herein. Additionally or alternatively, the UE 115 may perform aspects of the functions described herein using special-purpose hardware.

At 1805 the UE 115 may measure a quality of a number of beams for each of a plurality of cells. The operations of 1805 may be performed according to the methods described herein. In certain examples, aspects of the operations of 1805 may be performed by a quality measurement component as described with reference to FIGS. 11 through 14.

At 1810 the UE 115 may determine an average cell quality and a beam quality ratio for each of the plurality of cells based on the measurement of the number of beams for each of the plurality of cells, where the beam quality ratio indicates a ratio of a maximum beam quality and a minimum beam quality from the number of beams for each of the plurality of cells. The operations of 1810 may be performed according to the methods described herein. In certain examples, aspects of the operations of 1810 may be performed by an average quality component as described with reference to FIGS. 11 through 14.

At 1815 the UE 115 may transmit a measurement report indicating the average cell quality for each of the plurality of cells and the beam quality ratio associated with each average cell quality. The operations of 1815 may be performed according to the methods described herein. In certain examples, aspects of the operations of 1815 may be performed by a measurement report transmission component as described with reference to FIGS. 11 through 14.

Figure 19:
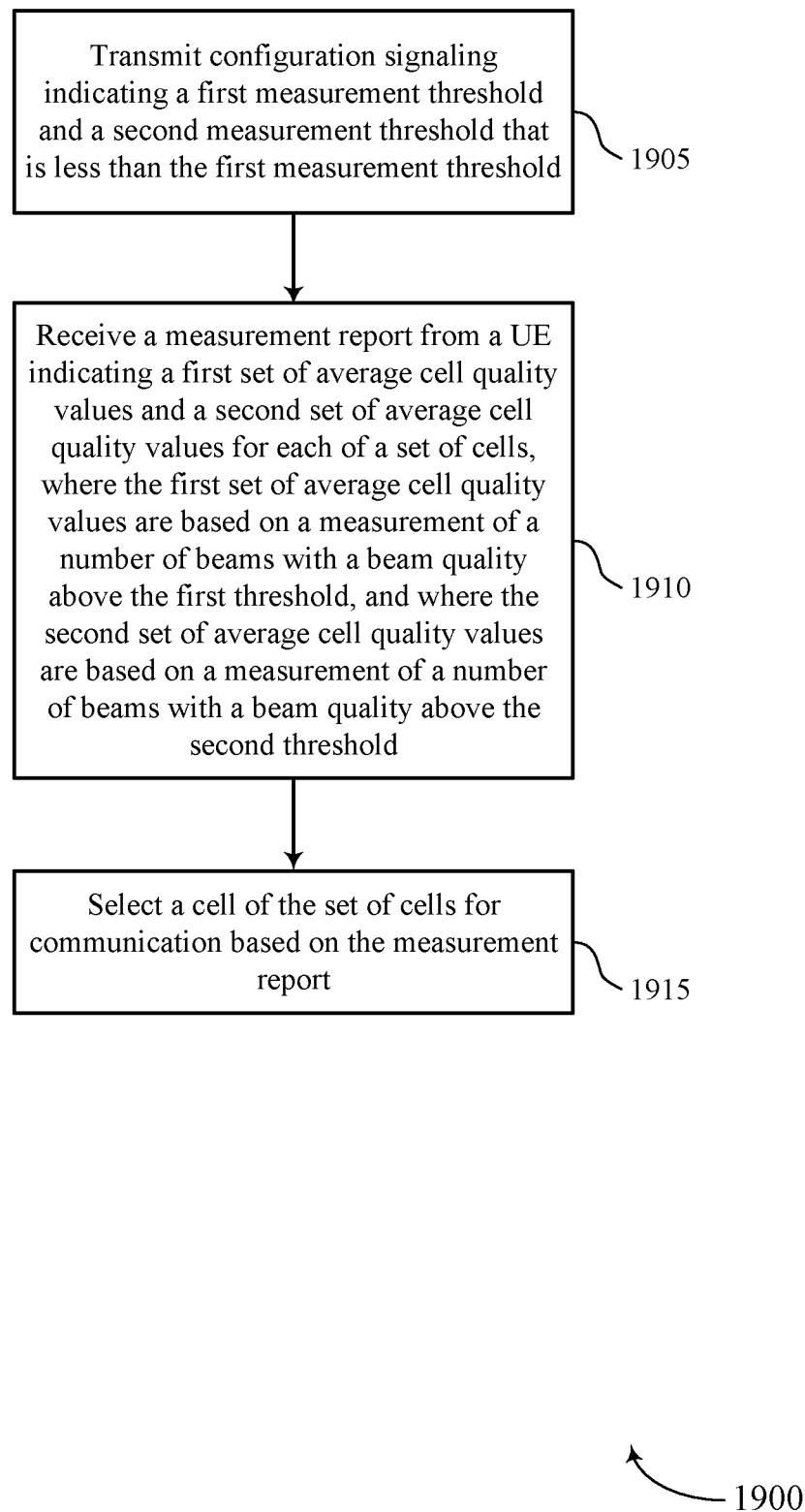

FIG. 19 shows a flowchart illustrating a method 1900 for cell quality measurement reporting for cells with mismatched beam numbers in accordance with aspects of the present disclosure. The operations of method 1900 may be implemented by a base station 105 or its components as described herein. For example, the operations of method 1900 may be performed by a base station communications manager as described with reference to FIGS. 7 through 10. In some examples, a base station 105 may execute a set of codes to control the functional elements of the device to perform the functions described herein. Additionally or alternatively, the base station 105 may perform aspects of the functions described herein using special-purpose hardware.

At 1905 the base station 105 may transmit configuration signaling indicating a first measurement threshold and a second measurement threshold that is less than the first measurement threshold. The operations of 1905 may be performed according to the methods described herein. In certain examples, aspects of the operations of 1905 may be performed by a threshold configuration component as described with reference to FIGS. 7 through 10.

At 1910 the base station 105 may receive a measurement report from a UE indicating a first plurality of average cell quality values and a second plurality of average cell quality values for each of a plurality of cells, where the first plurality of average cell quality values are based on a measurement of a number of beams with a beam quality above the first measurement threshold, and where the second plurality of average cell quality values are based on a measurement of a number of beams with a beam quality above the second measurement threshold. The operations of 1910 may be performed according to the methods described herein. In certain examples, aspects of the operations of 1910 may be performed by a measurement report component as described with reference to FIGS. 7 through 10.

At 1915 the base station 105 may select a cell of the plurality of cells for communication based on the measurement report. The operations of 1915 may be performed according to the methods described herein. In certain examples, aspects of the operations of 1915 may be performed by a cell selection component as described with reference to FIGS. 7 through 10.

Figure 20:
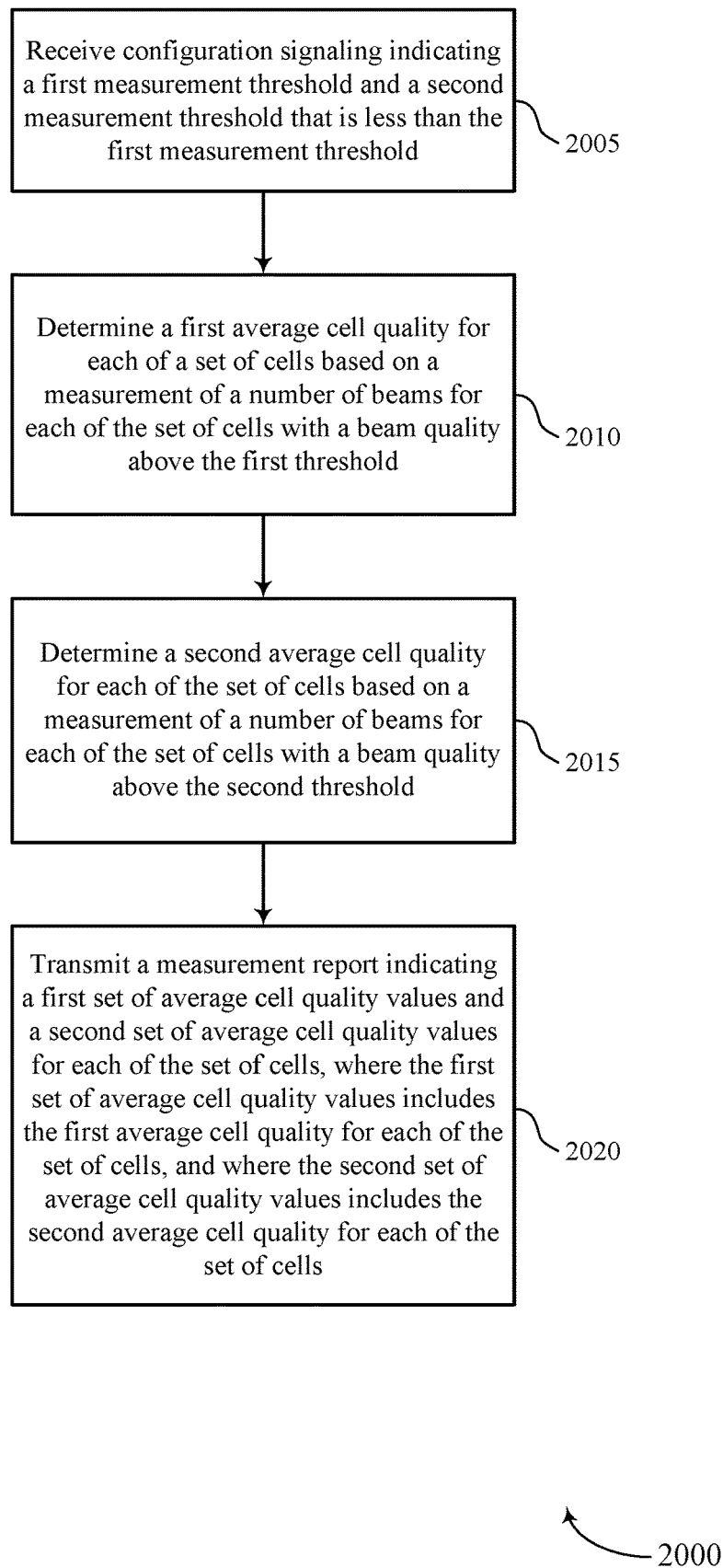

FIG. 20 shows a flowchart illustrating a method 2000 for cell quality measurement reporting for cells with mismatched beam numbers in accordance with aspects of the present disclosure. The operations of method 2000 may be implemented by a UE 115 or its components as described herein. For example, the operations of method 2000 may be performed by a UE communications manager as described with reference to FIGS. 11 through 14. In some examples, a UE 115 may execute a set of codes to control the functional elements of the device to perform the functions described herein. Additionally or alternatively, the UE 115 may perform aspects of the functions described herein using special-purpose hardware.

At 2005 the UE 115 may receive configuration signaling indicating a first measurement threshold and a second measurement threshold that is less than the first measurement threshold. The operations of 2005 may be performed according to the methods described herein. In certain examples, aspects of the operations of 2005 may be performed by a threshold reception component as described with reference to FIGS. 11 through 14.

At 2010 the UE 115 may determine a first average cell quality for each of a plurality of cells based on a measurement of a number of beams for each of the plurality of cells with a beam quality above the first measurement threshold. The operations of 2010 may be performed according to the methods described herein. In certain examples, aspects of the operations of 2010 may be performed by a first average quality component as described with reference to FIGS. 11 through 14.

At 2015 the UE 115 may determine a second average cell quality for each of the plurality of cells based on a measurement of a number of beams for each of the plurality of cells with a beam quality above the second measurement threshold. The operations of 2015 may be performed according to the methods described herein. In certain examples, aspects of the operations of 2015 may be performed by a second average quality component as described with reference to FIGS. 11 through 14.

At 2020 the UE 115 may transmit a measurement report indicating a first plurality of average cell quality values and a second plurality of average cell quality values for each of the plurality of cells, where the first plurality of average cell quality values includes the first average cell quality for each of the plurality of cells, and where the second plurality of average cell quality values includes the second average cell quality for each of the plurality of cells. The operations of 2020 may be performed according to the methods described herein. In certain examples, aspects of the operations of 2020 may be performed by a measurement report transmission component as described with reference to FIGS. 11 through 14.

Figure 21:
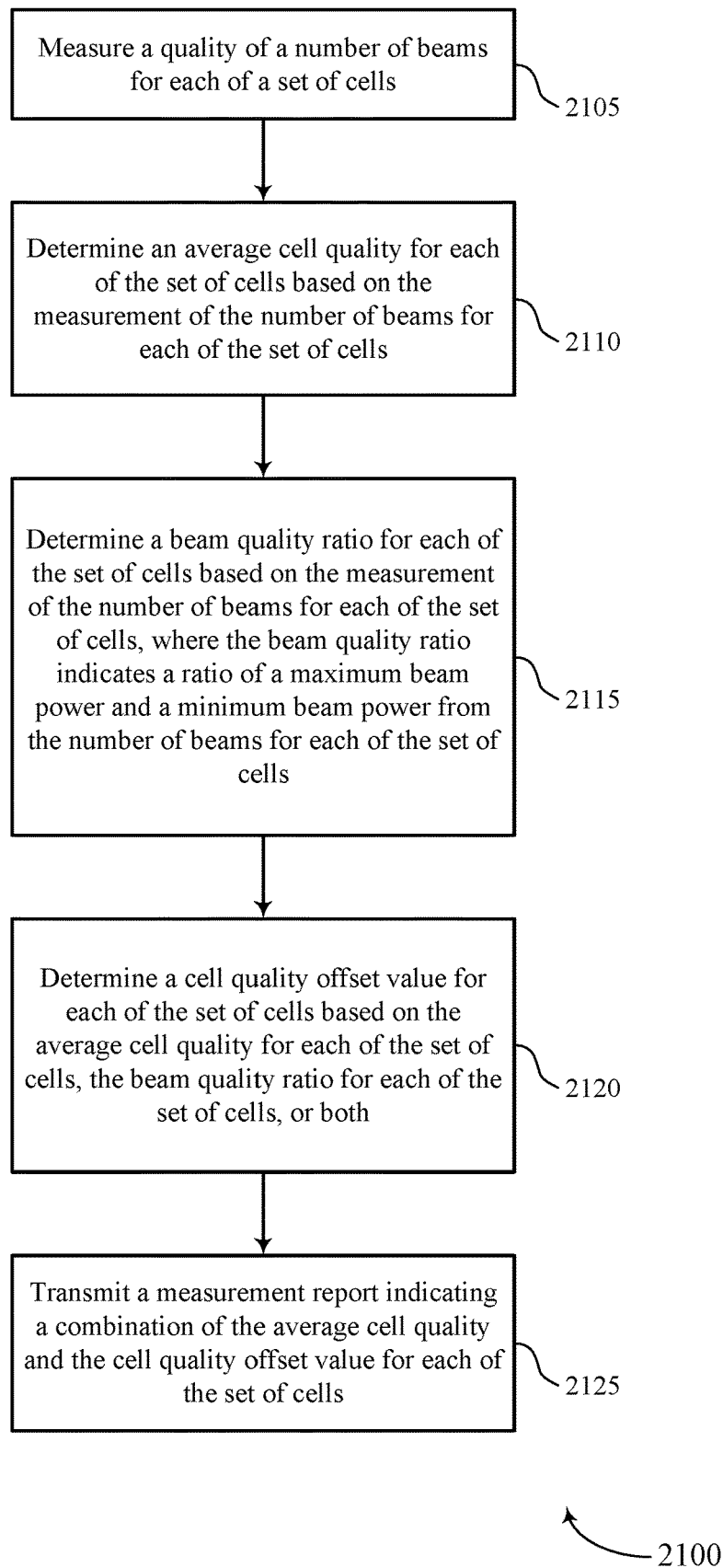

FIG. 21 shows a flowchart illustrating a method 2100 for cell quality measurement reporting for cells with mismatched beam numbers in accordance with aspects of the present disclosure. The operations of method 2100 may be implemented by a UE 115 or its components as described herein. For example, the operations of method 2100 may be performed by a UE communications manager as described with reference to FIGS. 11 through 14. In some examples, a UE 115 may execute a set of codes to control the functional elements of the device to perform the functions described herein. Additionally or alternatively, the UE 115 may perform aspects of the functions described herein using special-purpose hardware.

At 2105 the UE 115 may measure a quality of a number of beams for each of a plurality of cells. The operations of 2105 may be performed according to the methods described herein. In certain examples, aspects of the operations of 2105 may be performed by a quality measurement component as described with reference to FIGS. 11 through 14.

At 2110 the UE 115 may determine an average cell quality for each of the plurality of cells based on the measurement of the number of beams for each of the plurality of cells. The operations of 2110 may be performed according to the methods described herein. In certain examples, aspects of the operations of 2110 may be performed by an average quality component as described with reference to FIGS. 11 through 14.

At 2115 the UE 115 may determine a beam quality ratio for each of the plurality of cells based on the measurement of the number of beams for each of the plurality of cells, where the beam quality ratio indicates a ratio of a maximum beam power and a minimum beam power from the number of beams for each of the plurality of cells. The operations of 2115 may be performed according to the methods described herein. In certain examples, aspects of the operations of 2115 may be performed by a quality ratio component as described with reference to FIGS. 11 through 14.

At 2120 the UE 115 may determine a cell quality offset value for each of the plurality of cells based on the average cell quality for each of the plurality of cells, the beam quality ratio for each of the plurality of cells, or both. The operations of 2120 may be performed according to the methods described herein. In certain examples, aspects of the operations of 2120 may be performed by a offset value component as described with reference to FIGS. 11 through 14.

At 2125 the UE 115 may transmit a measurement report indicating a combination of the average cell quality and the cell quality offset value for each of the plurality of cells. The operations of 2125 may be performed according to the methods described herein. In certain examples, aspects of the operations of 2125 may be performed by a measurement report transmission component as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving a measurement report from a user equipment (UE) indicating an average cell quality for each of a plurality of cells and a number of beams associated with each average cell quality;
   determining whether the number of beams associated with each average cell quality is the same; and
   selecting a cell of the plurality of cells for communication based at least in part on the determining whether the number of beams associated with each average cell quality is the same.

2. The method of claim 1, further comprising:
   selecting the cell of the plurality of cells based at least in part on a default cell selection configuration if the number of beams associated with each average cell quality is the same.

3. The method of claim 1, further comprising:
   calculating a difference between each average cell quality and a highest average cell quality from among the average cell qualities if the number of beams associated with each average cell quality is not the same.

4. The method of claim 3, further comprising:
   determining whether the difference between the highest average cell quality and a cell quality for a candidate cell of the plurality of cells is less than a threshold.

5. The method of claim 4, further comprising:
   selecting the cell of the plurality of cells based at least in part on a default cell selection configuration if the difference between the highest average cell quality and the average cell quality for the candidate cell is greater than the threshold.

6. The method of claim 4, further comprising:
determining whether the number of beams associated with the highest average cell quality is less than the number of beams associated with the average cell quality for the candidate cell if the difference between the highest average cell quality and the average cell quality for the candidate cell is less than the threshold.

7. The method of claim 6, further comprising:
selecting the cell of the plurality of cells based at least in part on a default cell selection configuration if the number of beams associated with the highest average cell quality is greater than the number of beams associated with the average cell quality for the candidate cell.

8. The method of claim 6, further comprising:
selecting the candidate cell as the cell of the plurality of cells if the number of beams associated with the highest average cell quality is less than the number of beams associated with the average cell quality for the candidate cell.

9. The method of claim 1, further comprising:
receiving an indication of a mobility condition of the UE.

10. The method of claim 1, further comprising:
selecting the cell of the plurality of cells for communication based at least in part on a mobility condition of the UE.

11. The method of claim 10, further comprising:
selecting the cell of the plurality of cells based at least in part on the number of beams associated with the cell of the plurality of cells if a difference between a highest average cell quality and a cell quality for a candidate cell of the plurality of cells is less than a threshold.

12. The method of claim 11, wherein the mobility condition comprises a high mobility condition.

13. A method for wireless communication at a user equipment (UE), comprising:
measuring a quality of a number of beams for each of a plurality of cells;
determining an average cell quality for each of the plurality of cells based at least in part on a measurement of the number of beams for each of the plurality of cells; and
transmitting a measurement report indicating the average cell quality for each of the plurality of cells and the number of beams associated with each average cell quality.

14. The method of claim 13, further comprising:
transmitting an indication of a mobility condition of the UE.

15. The method of claim 13, further comprising:
receiving an indication of a selected cell.

* * * * *